(12) United States Patent
Master et al.

(10) Patent No.: US 9,280,598 B2
(45) Date of Patent: *Mar. 8, 2016

(54) SYSTEMS AND METHODS FOR SOUND RECOGNITION

(75) Inventors: Aaron Steven Master, Mountain View, CA (US); Timothy P. Stonehocker, Sunnyvale, CA (US); Benjamin John Levitt, Mountain View, CA (US); Jun Huang, San Jose, CA (US); Keyvan Mohajer, San Jose, CA (US)

(73) Assignee: Soundhound, Inc., Santa Clara, CA (US)

( * ) Notice: Subject to any disclaimer, the term of this patent is extended or adjusted under 35 U.S.C. 154(b) by 1008 days.

This patent is subject to a terminal disclaimer.

(21) Appl. No.: 12/773,753

(22) Filed: May 4, 2010

(65) Prior Publication Data
US 2010/0211693 A1 Aug. 19, 2010
US 2013/0254422 A2 Sep. 26, 2013

(51) Int. Cl.
*G06F 17/00* (2006.01)
*G06F 17/30* (2006.01)

(52) U.S. Cl.
CPC .... *G06F 17/30758* (2013.01); *G06F 17/30743* (2013.01); *G06F 17/30749* (2013.01)

(58) Field of Classification Search
CPC .................... G06F 17/30743; G06F 17/30758; G10H 2240/135; G10H 2240/141
USPC ............................ 700/94; 704/231, 247, 270; 707/913–916, 758, 769, 771, 705, 707/999.107, 999.003, E17.101, E17.102, 707/E17.103, E17.009
See application file for complete search history.

(56) References Cited

U.S. PATENT DOCUMENTS

| | | | |
|---|---|---|---|
| 5,969,283 A * | 10/1999 | Looney et al. | 84/609 |
| 5,974,409 A * | 10/1999 | Sanu et al. | 1/1 |
| 7,693,720 B2 | 4/2010 | Kennewick et al. | |
| 8,296,179 B1 | 10/2012 | Rennison | |
| 8,688,253 B2 | 4/2014 | Master et al. | |
| 8,694,534 B2 | 4/2014 | Mohajer | |
| 8,694,537 B2 | 4/2014 | Mohajer | |
| 8,856,148 B1 | 10/2014 | Master et al. | |
| 2001/0014891 A1* | 8/2001 | Hoffert et al. | 707/104.1 |

(Continued)

FOREIGN PATENT DOCUMENTS

| | | |
|---|---|---|
| EP | 2856358 | 4/2015 |
| WO | WO2008004181 | 1/2008 |
| WO | WO2013177213 | 11/2013 |

OTHER PUBLICATIONS

Avery Li-Chun Wang, An Industrial-Strength Audio Search Algorithm, In ISMIR 2003, 4th Symposium Conference on Music Information Retrieval (Oct. 26, 2003), pp. 7-13.

(Continued)

*Primary Examiner* — Andrew C Flanders
(74) *Attorney, Agent, or Firm* — Carr & Ferrell LLP

(57) ABSTRACT

Systems and methods for recognizing sounds are provided herein. User input relating to one or more sounds is received from a computing device. Instructions, which are stored in memory, are executed by a processor to discriminate the one or more sounds, extract music features from the one or more sounds, analyze the music features using one or more databases, and obtain information regarding the music features based on the analysis. Further, information regarding the music features of the one or more sounds may be transmitted to display on the computing device.

28 Claims, 22 Drawing Sheets

(56) References Cited

U.S. PATENT DOCUMENTS

| | | | |
|---|---|---|---|
| 2002/0138630 | A1 | 9/2002 | Solomon et al. |
| 2003/0078928 | A1 | 4/2003 | Dorosario et al. |
| 2003/0106413 | A1* | 6/2003 | Samadani et al. ............. 84/603 |
| 2004/0019497 | A1 | 1/2004 | Volk et al. |
| 2004/0193420 | A1 | 9/2004 | Kennewick et al. |
| 2005/0016360 | A1* | 1/2005 | Zhang ............................ 84/600 |
| 2005/0027699 | A1* | 2/2005 | Awadallah et al. ............... 707/3 |
| 2006/0155694 | A1* | 7/2006 | Chowdhury et al. ............. 707/4 |
| 2006/0242017 | A1 | 10/2006 | Libes et al. |
| 2007/0288444 | A1 | 12/2007 | Nelken et al. |
| 2008/0154951 | A1 | 6/2008 | Martinez et al. |
| 2008/0249982 | A1* | 10/2008 | Lakowske .......................... 707/3 |
| 2008/0255937 | A1 | 10/2008 | Chang et al. |
| 2009/0064029 | A1 | 3/2009 | Corkran et al. |
| 2010/0121643 | A1 | 5/2010 | Mohajer et al. |
| 2010/0205166 | A1 | 8/2010 | Boulter et al. |
| 2010/0250497 | A1 | 9/2010 | Redlich et al. |
| 2011/0071819 | A1 | 3/2011 | Miller et al. |
| 2012/0030199 | A1 | 2/2012 | Mohajer |
| 2012/0232683 | A1 | 9/2012 | Master et al. |
| 2012/0233157 | A1 | 9/2012 | Mohajer |
| 2012/0233207 | A1 | 9/2012 | Mohajer |
| 2013/0254029 | A1 | 9/2013 | Mohajer |
| 2014/0019483 | A1 | 1/2014 | Mohajer |

OTHER PUBLICATIONS

Venkatachalam, V., Cazzanti, L., Chillon, N., Wells, M., Automatic Identification of Sound Recordings, Signal Processing Magazine, IEEE, Mar. 2004, 92-99, vol. 21, Issue 2.

Nelson, Jeffrey, V Cast Song ID from Verizon Wireless. May 21, 2007.

Gracenote: MusicID, available at http://www.gracenote.com/business_solutions/music_id/, last accessed Aug. 4, 2010.

Shazam: http://web.archive.org/web/20100501190631/http://www.shazam.com/. Last accessed May 1, 2010.

App Shopper Shazam: http://appshopper.com/music/shazam. Last changed May 23, 2013.

Gracenote Mobile MusicID: http://web.archive.org/web/20100123211802/http://www.gracenote.com/ business_solutions/mobileMusic/. Last accessed Jan. 23, 2010.

App Shopper MusicID: http://appshopper.com/music/musicid. Last changed Feb. 8, 2013.

Wang. "The Shazam Music Recognition Service," Communications of the ACM(Magazine), Aug. 2006. vol. 49, No. 8, p. 44-48. <http://dl.acm.org/citation.cfm?id=1145312>.

Xu et al. "Music Identification Via Vocabulary Tree with MFCC Peaks," MIRUM'11 Proceedings of the 1st international ACM workshop on Music information retrieval with user-centered and multimodal strategies, 2011. pp. 21-26. <http://.dl.acm.org/citation.cfm?doid=2072529.2072537>.

Li et al. "Robust Audio Identification for MP3 Popular Music," SIGIR '10 Proceedings of the 33rd international ACM SIGIR conference on Research and development in information retrieval, Jul. 2010. pp. 627-634. <http://dl.acm.org/citation.cfm?doid=1835449.1835554>.

Yu et al. "A Query-By-Singing System for Retrieving Karaoke Music," IEEE Transactions on Multimedia, Dec. 2008, vol. 10, No. 8, pp. 1626-1637. <http://ieeexplore.ieee.org/xpl/articleDetails.jsp?arnumber=4694852>.

Casey et al. "Content-Based Music Information Retrieval: Current Directions and Future Challenges," Proceedings of the IEEE, 2008. vol. 96, No. 4, pp. 668-696. <http://research.yahoo.com/pub/2649>.

Liu et al. "Content-Based Retrieval of MP3 Music Objects," CIKM '01 Proceedings of the tenth international conference on Information and knowledge management, 2001. pp. 506-511. <http://dx.doi.org/10.1145/502585.502670>.

OMRAS2—Ontology-Driven Music Retrieval & Annotation Sharing Service. Overview-Apr. 24, 2009 [Accessed Sep. 27, 2012—Archive.org] <http://web.archive.org/web/20090424083019/http://www.omras2.org/overview>.

OMRAS2—AudioDB—Populating and Querying an AudioDB Instance, accessed 9127/2012, <http:1/omras2.org/audioDB/tutoriall>.

Benson et al. "Sync Kit: A Persistent Client-Side Database Caching Toolkit for Data Intensive Websites,"Proceedings of the 19th International Conference on World Wide Web, Apr. 2010. pp. 121-130. <http://dl.acm. org/citation.cfm?id=1772704>.

Larson et al. "NYT to Release Thesaurus and Enter Linked Data Cloud," NY Times Blogs, Jun. 2009. <http://open.blogs.nytimes.com/2009/06/26/nyt-to-release-thesaurus-and-enterlinked-data-cloud/>.

"Aurix Enhances Effectiveness Of Leading Search Software," Aurix.com—News. Jun. 1, 2010. <http://www.aurix.com/ pp./38081Aurix_enhances_effectiveness_of leading_search_software.htm>.

"Hearing it Loud & Clear at SpeechTEK 2010," Aurix.com—News. Jul. 21, 2010. <http://www.aurix.com/pp./4161/State_of_the_art_speech_technology.htm>.

Jamil. "A Natural Language Interface Plug-In for Cooperative Query Answering in Biological Databases," BMC Genomics, Nov. 2011. (Accessed Sep. 27, 2012) <http://www.biomedcentral.com/1471-2164/13/S3/S4>.

Feng. "A General Framework for Building Natural Language Understanding Modules In Voice Search," 2010 IEEE International Conference on Acoustics Speech and Signal Processing (ICASSP), Mar. 2010. (Accessed Sep. 27, 2012—IEEE) <http:Meeexplore.ieee.org/xpl/articleDetails.jsp?arnumber=5494951>.

Langanke. "Direct Voice Control Speech Data Entry and Database Query Models," International Symposium on Logistics and Industrial Informatics, Sep. 2007. (Accessed Sep. 27, 2012—IEEE) <http://ieeexplore.ieee.org/xpl/articleDetails.jsp?arnumber=4343522>.

Indukuri et al. "Natural Language Querying Over Databases Using Cascaded CRFs," Lecture Notes in Computer Science, Sep. 2010. <http://www.springerlink.com/content15w1x27650475304m>.

Kolias et al. "Design and implementation of a VoiceXML-driven wiki application for assistive environments on the web," Personal and Ubiquitous Computing, Sep. 2010. vol. 14, No. 6, pp. 527-539. <http://www.icsd.aegean.gr/publication_files/journa1/295233664.pdf>.

International Search Report & Written Opinion of the International Searching Authority mailed Dec. 2, 2013 in Patent Cooperation Treaty Application No. PCT/US2013/042097, filed May 21, 2013.

\* cited by examiner

SYSTEMS AND METHODS FOR SOUND RECOGNITION

FIELD OF THE INVENTION

This invention relates generally to systems and methods for sound recognition, and more particularly, to systems and methods for recognizing music, speech, and other sounds.

SUMMARY OF THE INVENTION

Systems, methods and media for sound recognition are provided herein. One object of the present technology is to recognize sounds. Sounds may include a song, a song clip, a song snippet, a singing or humming sound, voice, or any combination thereof. A further object of the present technology is to discriminate or classify sounds using an audio discriminator. Sounds may include music, speech and vocal sounds (such as humming and singing). A further object of the present technology is to receive and analyze a search query furnished by sound input via a unified search interface, where the sound input may be in one or more different formats (including but not limited to monophonic music, polyphonic music, speech, spoken words, a singing sound, a humming sound, any other type of sound that may be provided as input or any combination thereof). Once the sound input is received, with the help of the audio discriminator, a server may transmit search results in response to the search query. Another object of the present technology is to search databases and furnish a user with information regarding one or more particular sounds. According to various embodiments, the present technology permits one to provide user input by way of a computing device. User input via the computing device may include any type of user input, including but not limited to audio input, such as a user playing a sound, singing or humming, or speaking. Since songs, song clips and song snippets include sounds, one skilled in the art will recognize that the technology allows for a user to play a song, hum a song or even sing a song as the user input.

In response to the user input, the technology described herein may search one or more databases to identify the sound and provide the user with information about the sound. For instance, if a user hums a portion of a song, the present technology will discriminate the sounds, and based on that discrimination, search one or more databases to determine the title and artist of the song and provide this information to the user. A further object of the present technology is to provide music discovery related to a song. Such music discovery may include additional songs sung by the same artist, the artist's biographical information, information regarding artists that are similar to the artist who sang the song, recommendations regarding music, and videos or video links regarding the song, the artist, or any similar artists.

These and other objects of the present technology are achieved in an exemplary method of recognizing sounds. User input relating to one or more sounds is received from a computing device. Instructions, which are stored in memory, are executed by a processor to discriminate the one or more sounds, extract music features from the one or more sounds, analyze the music features using one or more databases, and obtain information regarding the music features based on the analysis. Further, information regarding the music features of the one or more sounds may be transmitted to display on the computing device.

A further exemplary method for recognizing one or more sounds includes a number of steps. User input providing a search query may comprise one or more sounds. The user input may be received from a computing device. Instructions, which are stored in memory, are executed by a processor to discriminate the one or more sounds, by classifying and routing the one or more sounds to one of three sound recognition applications for processing based on sound type, the three sound recognition applications comprising a first sound recognition application for singing or humming sounds, a second sound recognition application for recorded music, and a third sound recognition application for speech.

Further instructions, which are stored in memory, are executed by a processor to extract music features from the one or more sounds, analyze and search the music features using one of three databases for searching based on sound type, the three databases comprising a first database for singing or humming sounds, a second database for recorded music, and a third database for speech, and obtain information regarding the music features based on the analysis, searching and extraction. In response to the search query, information regarding the music features of the one or more sounds may be transmitted to display on the display of the computing device.

An audio discriminator is also provided herein. The audio discriminator may comprise a classifier of one or more sounds received by user input. The user input provides a search query comprising the one or more sounds. The user input may be received through a unified search interface provided by a computing device. The audio discriminator may include a classifier of the one or more sounds which classifies sounds based on one of three sound types, the three sound types being humming or singing sounds, recorded music and speech. The audio discriminator may further comprise a router of the one or more sounds to a database based on the classification of sound type.

In some embodiments, the objects of the present technology may be implemented by executing a program by a processor, wherein the program may be embodied on a computer readable storage medium.

DETAILED DESCRIPTION OF THE INVENTION

Embodiments of the present technology provide systems, methods, and media for recognizing sounds. According to various embodiments, the technology may utilize an audio discriminator to distinguish and channel audio outputs separately. In some embodiments, the audio discriminator may discriminate singing or humming sounds, recorded music, polyphonic sounds, and speech separately. In other embodiments, the audio discriminator may discriminate monophonic sounds from polyphonic sounds. By doing this, the technology may quickly recognize, discern or otherwise identify a sound.

Due to the audio discriminator, the technology may allow for a computing device to receive sound input from a user through a unified search interface. The unified search interface may allow for the user to provide sound input without having to choose or select what type of sound input they are providing. In other words, with the unified search interface, the user may provide any type of sound input with the computing device (whether the sound input may be singing or humming sounds, recorded music, speech or any combination thereof), without having to designate what type of sound input is being provided. This in turn provides the user with a superior user experience, without little to no hassle on the part of the user.

The audio discriminator will discriminate or classify the one or more sounds that make up the received sound input. In some embodiments, the audio discriminator classifies the one or more sounds to one of three separate sound recognition applications, where each of the three separate sound recognition applications is also coupled to a designated database. A separate sound recognition application may each be provided for the three exemplary types of sound input (namely, singing/humming sounds, recorded music (polyphonic sounds) and speech). However, one skilled in the art will appreciate that any number of sound recognition applications and databases may be utilized in implementing the methods and systems described herein.

With this type of technology, the resulting analysis of the one or more sounds may be quickly delivered to the user. For instance, if the sound is a song snippet that is hummed into a microphone on a computing device, in some embodiments, the technology can quickly recognize parameters of the song, such as the name of the song, the artist of the song, and the lyrics of the song, and provide information related to the song, such as the song parameters and information regarding the artist of the song. Due to its unique and novel features which will be described in greater detail, the technology may recognize sounds and determine information related to the sounds within a short time (as little as four seconds). These and other unique features of the technology will be described later herein.

Figure 1A:
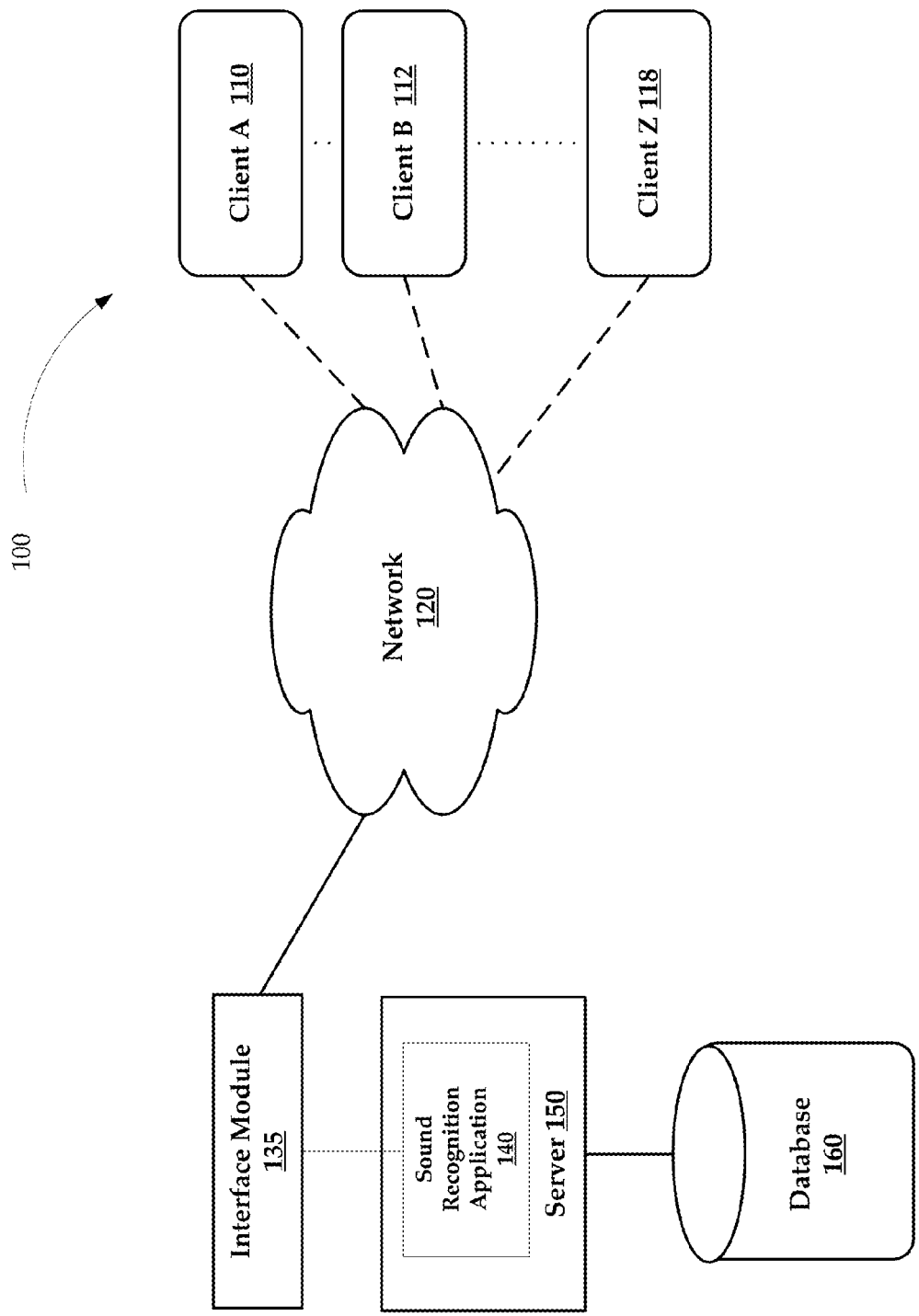
FIG. 1A is a block diagram of an exemplary networking environment in accordance with various embodiments of the present invention.

FIG. 1A is a block diagram of an exemplary networking environment 100 in accordance with embodiments of the present invention. The networking environment 100 includes clients A 110, B 112, and so forth through client Z 118 (additional or fewer clients may be implemented), a network 120, a server 150 with a sound recognition application 140 and an interface module 135, and a database 160. As with all of the figures provided herein, one skilled in the art will recognize that any number of elements 110-160 can be present in the networking environment 100 and that the exemplary methods described herein can be executed by one or more of elements 110-160. Any number of any of elements 110-160 can be present in the networking environment 100, and the networking environment 100 is configured to serve these elements. For example, the server 150 may transmit a report via the network 120 to clients 110-118, despite the fact that only three clients are shown in FIG. 1A. For all figures mentioned herein, like numbered elements refer to like elements throughout.

Clients 110-118 may be implemented as computers having a processor that runs software stored in memory, wherein the software may include network browser applications (not shown) configured to render content pages, such as web pages, from the server 150. Clients 110-118 can be any computing device, including, but not limited to desktop computers, laptop computers, computing tablets (such as the iPad®), mobile devices, smartphones (such as the iPhone®), and portable digital assistants (PDAs). The clients 110-118 may communicate with a web service provided by the server 150 over the network 120. Additionally, the clients 110-118 may be configured to store an executable application that encompasses one or more functionalities provided by the sound recognition application 140.

The network 120 can be any type of network, including but not limited to the Internet, LAN, WAN, a telephone network, and any other communication network that allows access to data, as well as any combination of these. The network 120 may be coupled to any of the clients 110-118, the interface module 135, and/or the server 150. As with all the figures provided herewith, the networking environment 100 is exemplary and not limited to what is shown in FIG. 1A.

The server 150 can communicate with the network 120 and the database 160. It will be apparent to one skilled in the art that the embodiments of this invention are not limited to any particular type of server and/or database. For example, the server 150 may include one or more application servers, one or more web servers, or a combination of such servers. In some embodiments, the servers mentioned herein are configured to control and route information via the network 120 or any other networks (additional networks not shown in FIG. 1A). The servers herein may access, retrieve, store and otherwise process data stored on any of the databases mentioned herein.

Interface module 135 may be implemented as a machine separate from server 150 or as hardware, software, or combination of hardware and software implemented on server 150. In some embodiments, interface module 135 may relay communications between the sound recognition application 140 and network 120.

The database 160 may be configured to store one or more sounds (including but not limited to speech, voice, songs, song clips or snippets, and any combination thereof), music features, information about the one or more sounds, information about the music features, or any combination thereof. The database and its contents may be accessible to the sound recognition application 140. The one or more sounds may include a song, a song clip, a song snippet, a humming sound, voice, or any combination thereof. In a non-exhaustive list, the information about the one or more sounds or the music features of the one or more sounds may include song title, a name of an artist, an artist's biographical information, identification of similar artists, a link to download a song, a link to download a video related to the song, or any combination thereof.

The clients 110-118 may interface with the sound recognition application 140 on server 150 via the network 120 and the interface module 135. The sound recognition application 140 may receive requests, queries, and/or data from the clients 110-118. The clients 110-118, may provide data for storage in the database 160, and therefore may be in communication with the database 160. Likewise, the sound recognition application 140 may access the database 160 based on one or more requests or queries received from the clients 110-118. Further details as to the data communicated in the networking environment 100 are described more fully herein.

Figure 1B:
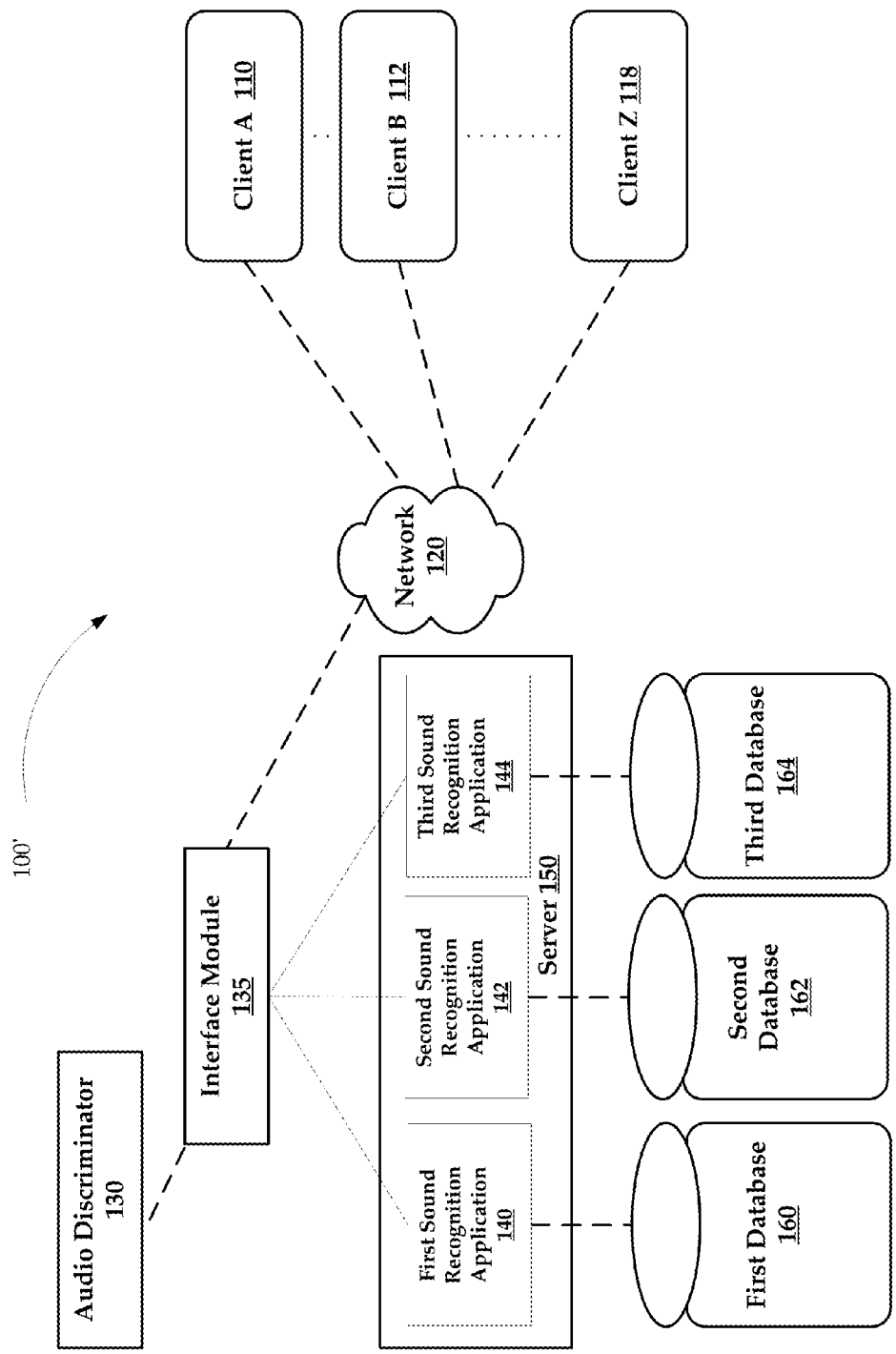
FIG. 1B is a block diagram of a further exemplary networking environment in accordance with various embodiments of the present invention.

FIG. 1B is a block diagram of a further exemplary networking environment 100' in accordance with embodiments of the present invention. For all figures mentioned herein, like numbered elements refer to like elements throughout. Thus, there are some like elements that are shown both in FIG. 1A and FIG. 1B. However, FIG. 1B differs from FIG. 1A in that an audio discriminator 130 is coupled to the interface module 135. Although in FIG. 1B the audio discriminator 130 is shown as an element coupled to the interface module 135, one skilled in the art may recognize that the audio discriminator 130 may be included and/or coupled with any number of elements 110-164. Thus, in some embodiments, the audio discriminator 130 may be included with the server 150.

As described earlier, the audio discriminator 130 may discriminate or classify the one or more sounds that make up the received sound input. In some embodiments, the audio discriminator 130 classifies the one or more sounds to one of three separate sound recognition applications, where each of the three separate sound recognition applications is also coupled to a designated database, which is shown in exemplary FIG. 1B.

Unlike FIG. 1A, FIG. 1B shows that the interface module 135 is coupled to three applications, namely, a first sound recognition application 140, a second sound recognition application 142 and a third sound recognition application 144. According to various embodiments, the first sound recognition application 140 may be designated for signing and/or humming sounds, and work with the server 150 to process, search or otherwise analyze singing and/or humming sounds. According to various embodiments, the second sound recognition application 142 may be designated for recorded music or polyphonic sounds, and work with the server 150 to process, search or otherwise analyze recorded music or polyphonic sounds. In some embodiments, the third sound recognition application 144 may be designated for speech, and work with the server 150 to process, search or otherwise analyze speech.

Furthermore, FIG. 1B differs from FIG. 1A in that a separate database may be designated to each of the three sound recognition applications. Thus, in accordance with various embodiments, the first sound recognition application 140 may be coupled to a first database 160, the second sound recognition application 142 may be coupled to the second database 162, and the third sound recognition application 144 may be coupled to the third database 164. The first sound recognition application 140 may work with the server 150 to search the first database 160 for one or more singing and/or humming sounds. Likewise, the second sound recognition application 142 may work with the server 150 to search the second database 162 for one or more recorded music songs, snippets, or other polyphonic sounds. Also, the third sound recognition application 144 may work with the server 150 to search the third database 164 for speech.

According to various embodiments, the first database 160 may be designated to store singing and/or humming sounds and associated data. According to various embodiments, the second database 162 may be designated to store recorded music or polyphonic sounds (such as songs, song snippets, song clips, and the like) and associated data (such as music lyrics, artists, albums, album names, biographical information of artists, and the like). The third database 164 may be designated to store speech and associated data (such as the name of the speaker, the source of the speech, and the like).

As with all of the figures provided herein, one skilled in the art will recognize that any number of elements 110-164 can be present in the networking environment 100' and that the exemplary methods described herein can be executed by one or more of elements 110-164. Any number of any of elements 110-164 can be present in the networking environment 100', and the networking environment 100' is configured to serve these elements.

Figure 2:
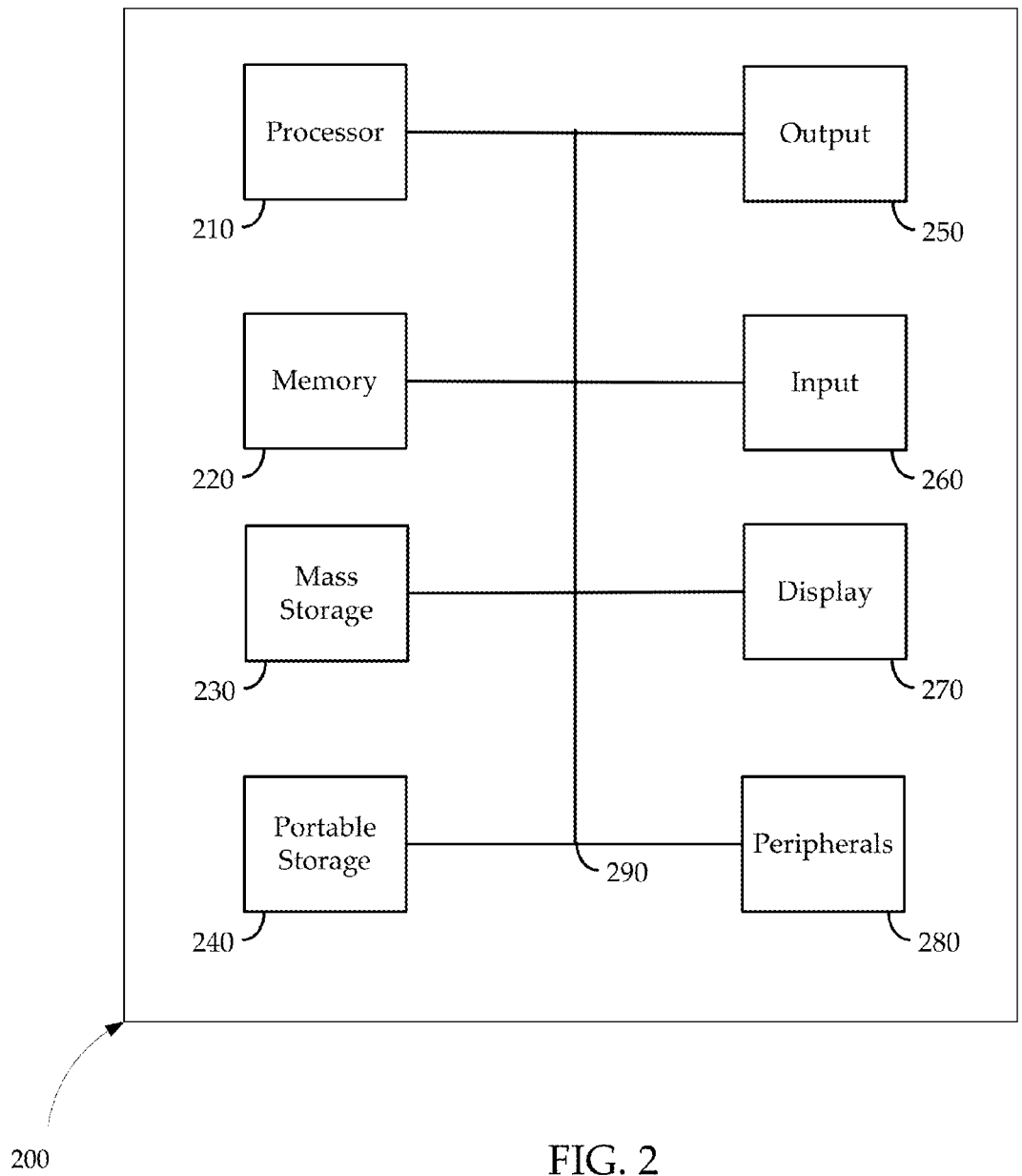
FIG. 2 is a block diagram of an exemplary computing device for recognizing sounds in accordance with embodiments of the present invention.

FIG. 2 is a block diagram of an exemplary computing device for recognizing sounds in accordance with embodiments of the present invention. In some embodiments, the exemplary computing device of FIG. 2 can be used to implement portions of the clients 110-118 and the server 150 as shown in FIGS. 1A and/or 1B.

The computer system 200 of FIG. 2 includes one or more processors 210 and main memory 220. The main memory 220 stores, in part, instructions and data for execution by the processors 210. The main memory 220 can store the executable code when in operation. The computer system 200 of FIG. 2 further includes a mass storage device 230, portable storage medium drive(s) or devices 240, output devices 250, user input devices 260, a graphics display system 270, and peripheral devices 280.

The components illustrated in FIG. 2 are depicted as being connected via a single bus 290. However, the components can be connected through one or more data transport means. For example, the processor unit 210 and the main memory 220 can be connected via a local microprocessor bus, and the mass storage device 230, peripheral device(s) 280, the portable storage device 240, and the display system 270 can be connected via one or more input/output (I/O) buses.

The mass storage device 230, which can be implemented with a magnetic disk drive or an optical disk drive, is a non-volatile storage device for storing data and instructions for use by the processor unit 210. The mass storage device 230 can store the system software for implementing embodiments of the present invention for purposes of loading that software into the main memory 220.

The portable storage device 240 operates in conjunction with a portable non-volatile storage medium, such as a floppy disk, compact disk or digital video disc, to input and output data and code to and from the computer system 200 of FIG. 2. The system software for implementing embodiments of the present invention can be stored on such a portable medium and input to the computer system 200 via the portable storage device 240.

Input devices 260 provide a portion of a user interface. Input devices 260 may include an alpha-numeric keypad, such as a keyboard, for inputting alpha-numeric and other information, or a pointing device, such as a mouse, a trackball, stylus, or cursor direction keys. Additionally, the system 200 as shown in FIG. 2 includes output devices 250. Examples of suitable output devices include speakers, printers, network interfaces, and monitors.

The display system 270 may include a CRT, a liquid crystal display (LCD) or other suitable display device. Display system 270 receives textual and graphical information, and processes the information for output to the display device.

Peripherals 280 may include any type of computer support device to add additional functionality to the computer system. For example, peripheral device(s) 280 may include a modem or a router.

The components contained in the computer system 200 of FIG. 2 are those typically found in computer systems that can be suitable for use with embodiments of the present invention and are intended to represent a broad category of such computer components that are well known in the art. Thus, the computer system 200 of FIG. 2 can be a personal computer, hand held computing device, telephone, mobile computing device, workstation, server, minicomputer, mainframe computer, or any other computing device. The computer can also include various bus configurations, networked platforms, multi-processor platforms, etc. Various operating systems can be implemented, including Unix, Linux, Windows, Macintosh OS, Palm OS, and other suitable operating systems.

Figure 3A:
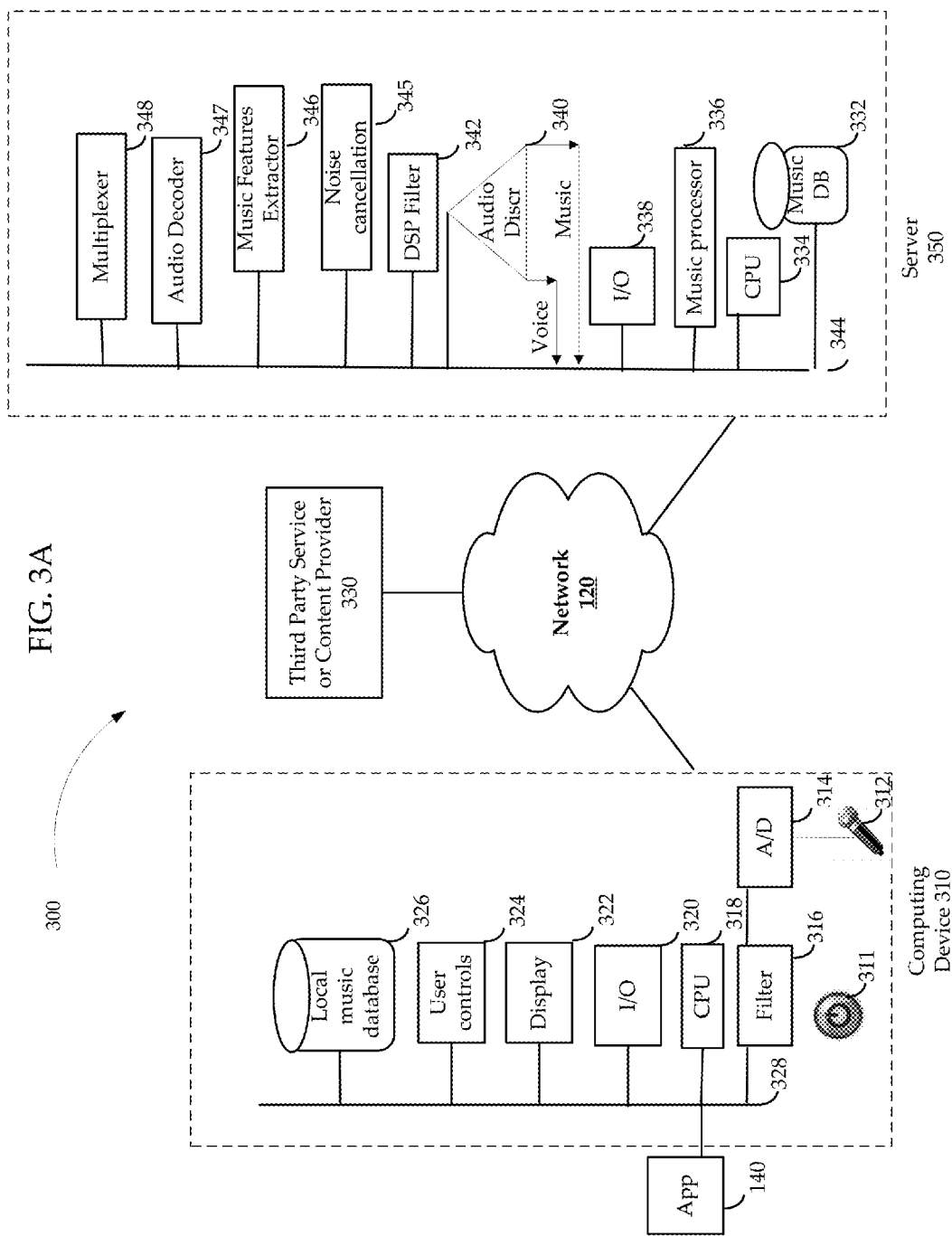
FIG. 3A is a block diagram of an exemplary architecture of a system for recognizing sounds in accordance with various embodiments of the present invention.

FIG. 3A is a block diagram of an exemplary architecture of a system 300 for recognizing sounds in accordance with various embodiments of the present invention. According to various embodiments, the system 300 includes one or more computing devices 310, a sound recognition application 140 coupled to the one or more computing devices 310, a network 120, a third-party service or content provider 330, and a server 350. Although various system components may be configured to perform some or all of the various steps described herein, fewer or more system components may be provided and still fall within the scope of various embodiments.

As described above, the one or more computing devices 310 may be any computing device, including, but not limited to desktop computers, laptop computers, computing tablets (such as the iPad®), mobile devices, smartphones (such as the iPhone®), and portable digital assistants (PDAs). The one or more computing devices 310 include a microphone 312, an analog/digital (A/D) converter 314, a filter 316, a CPU 318, an input/output interface 320, a display 322, user controls 324, and a local music database 326. The computing device 310 may include a button 311 for recording, selecting, pressing or otherwise providing user input to the computing device 310.

The one or more computing devices 310 may be coupled to a sound recognition application 140. The microphone 312 is a vehicle for a user to input one or more sounds to the one or more computing devices 310 for recognition. The one or more sounds may be processed by the analog/digital converter 314 so that the sounds may be converted from analog to digital signals. The one or more sounds may also be processed by a filter 316, to filter sound artifacts and eliminate any other type of unwanted noise from the one or more sounds.

The one or more computing devices 310 include a CPU 318, which executes or carries out the instructions stored in memory (not shown). In some embodiments, the CPU 318 executes instructions stored in memory that allow for it to launch the sound recognition application 140 on the one or more computing devices 310. The sound recognition application 140 may be coupled to the CPU 318. The one or more computing devices 310 also include an input/output interface 320 by which the one or more computing devices may communicate with the network 120.

The one or more computing devices 310 may include a display 322. The display 322 may be configured to display graphical user interfaces provided by the sound recognition application 140, to allow a user of the computing device 310 to interact with the server 350 via the sound recognition application 140. According to various embodiments, the display 322 may be configured to display information or data that is transmitted by the server 350 to the computing device 310 in response to a user's interaction with the sound recognition application 140. The display 322 may comprise a display system (such as the display system 270 of FIG. 2).

User controls 324 allow for a user to control or interact with the one or more computing devices 310. The user controls 324 may comprise input devices (such as input devices 260 of FIG. 2). A local music database 326 to store music may be included in the one or more computing devices 310. Further, one or more buses 328 couple the elements 312-348 in the one or more computing devices 310. Such buses may include the exemplary buses described earlier herein in relation to FIG. 2.

According to various embodiments, the computing device 310 may communicate to the server 350 and/or to a third party service or content provider 330 through the network 120 (such as the Internet). The third party service or content provider 330 may be any type of service provider, including but not limited to a music store (such as iTunes®). In some embodiments, a user of the computing device 310 may be offered an opportunity to download and/or purchase a song by means of the sound recognition application 140 and the server 350.

The server 350 may include several elements, including but not limited to a music database 332, a CPU 334, a music processor 336, an input/output interface 338, a digital signal processing filter 342, an audio discriminator 340, a noise cancellation module 345, a music feature extractor or extractors 346, an audio decoder 347, and a multiplexer 348. The music database 332 on the server 350 may store information, songs, sounds, albums, and other information. The music database 332 may comprise the database 160 of FIG. 1A. The CPU 334 of the server 350 executes instructions stored in memory (not shown) to implement any of the methods described herein, including methods for sound recognition. The music processor 336 executes instructions stored in memory to utilize methods of further processing music, as described later herein. The input/output interface 338 allows for the server 350 to receive and transmit communication to the computing device 310 via the network 120.

The digital signal processing filter 342 further filters or enhances the sounds to eliminate sound artifacts. The audio discriminator 340 may distinguish a user's query type that was submitted as sound input. Thus, the audio discriminator 340 may distinguish whether the sound input received from the user via the computing device is a singing or humming sound, recorded music, or speech. Then the audio discriminator 340 routes the discriminated sound(s) to the appropriate search engine. In some embodiments, the appropriate search engine may be a sound recognition application (such as a sound recognition application 140 of FIG. 1A). According to various embodiments, the audio discriminator 340 routes singing or humming sounds to a first sound recognition application (such as the first sound recognition application 140 of FIG. 1B), routes recorded music or polyphonic sounds to a second sound recognition application (such as the second sound recognition application 142 of FIG. 1B), and routes speech to a third sound recognition application (such as the third sound recognition application 144 of FIG. 1B).

The audio discriminator 340 may discriminate, distinguish, or classify sounds. In some embodiments, the audio discriminator 340 may channel outputs of voice and music separately. The audio discriminator 340 may discriminate monophonic sounds from polyphonic sounds. The audio discriminator 340 may determine this with a high accuracy. The audio discriminator 340 may analyze or look at the length of a user's query (whether the user's query be text, recorded audio, spoken words, sung or hummed music, or a combination thereof), as well as other features, including but not limited to pitch variations in the sounds, and any discrimination between speech (spoken word), voice, and music. By doing this, the technology may quickly classify a sound. The audio discriminator 340 may classify or discriminate voice and music through channels, and route those channels through processing (such as music processing by the music processor 336) and/or algorithmic analysis.

The noise cancellation module 345 may separate music features needed for analysis from background noise. The music features extractor 346 may extract music features from the one or more sounds. An audio decoder 347 and a multiplexer 348 may also be included in the server. Furthermore, one or more buses 344 couple the elements 332-348 in the one or more computing devices 310. Such buses may include the exemplary buses described earlier herein in relation to FIG. 2.

According to various embodiments of the present technology, a user may play, sing, hum or otherwise furnish an audible sound as user input to the computing device 310. The user may also input text (such as a search query in a text box) about a song as part of the user input. The audible sounds may be picked up by the microphone 312 of the computing device 310. The sounds are then digitized by the A/D converter 314 and filtered by the filter 316 to compress sound, such that the sounds may be transmitted quickly over the network 120. The sounds are then processed by means of the sound recognition application 140 and the server 350. The sound recognition application 140 may be coupled to the CPU 318. The user may also play music from his or her local music database 326 on the computing device 310.

The user may ask for a sound to be recognized by providing user input to the computing device 310. This request may be furnished to the server 350 through the network 120. In response to the request, the server 350 may discriminate sounds using the audio discriminator 340. Voice and music may be parsed out and classified accordingly by the audio discriminator 340. Music features of the sounds may be extracted using music features extractors (such as a music feature extractor 346 of FIG. 3A), which will be described in greater detail later. Such music features are then analyzed using one or more databases (such as search databases) with the help of database servers and search servers. Information regarding the music features are then obtained from the databases and routed through routers to the computing device 310 via the network 120. The information may be transmitted for display to the user on the display of the computing device 310.

Information regarding a song may include a song title, a name of an artist, an artist's biographical information, the name of the album where the song can be found, identification of similar artists, a link to download a song, a link to download a video related to the song (such as a YouTube® video), similar artists, recommendations, biography of an artist, or any combination thereof. A user may also choose a track and access lyrics as the song is played. The user may also select a button to request more information. The computing device 310 may also display a list of what types of searches the user previously performed using the sound recognition application 140. Searches may include speech searches. The searches may be spoken into the microphone of the computing device. An audio discriminator 340 provided by the server 350 may determine what type of sound was provided to the computing device 310.

As earlier stated, although various system components may be configured to perform some or all of the various steps described herein, fewer or more system components may be provided and still fall within the scope of various embodiments. For instance, although the exemplary system 300 in FIG. 3A shows one sound recognition application 140, the scope of the invention includes such embodiments where there may be more than one sound recognition application. In some various embodiments, instead of only one sound recognition application 140, the system 300 may include three separate sound recognition applications (such as a first sound recognition application 140, a second recognition application 142, and a third recognition application 144 as shown in FIG. 1B). Also, the server 350 may be the same as the server 150 in FIGS. 1A and 1B. As described earlier herein, according to various embodiments, a first sound recognition application may be designated for signing and/or humming sounds, and work with the server 350 to process, search or otherwise analyze singing and/or humming sounds. According to various embodiments, a second sound recognition application may be designated for recorded music or polyphonic sounds, and work with the server 350 to process, search or otherwise analyze recorded music or polyphonic sounds. In some embodiments, a third sound recognition application may be designated for speech, and work with the server 350 to process, search or otherwise analyze speech.

Also, in various embodiments, the system may also include a separate database designated to each of the three sound recognition applications. The first sound recognition application may work with the server 350 to search the first database (not shown) for one or more singing and/or humming sounds. Likewise, the second sound recognition application may work with the server 350 to search the second database (not shown) for one or more recorded music songs, snippets, or other polyphonic sounds. In some embodiments, the second database is shown as the local music database 326 in FIG. 3A. Also, the third sound recognition application may work with the server 350 to search the third database (not shown) for speech.

According to various embodiments, the first database 160 (FIG. 1B) may be designated to store singing and/or humming sounds and associated data. According to various embodiments, the second database 162 (FIG. 1B) may be designated to store recorded music or polyphonic sounds (such as songs, song snippets, song clips, and the like) and associated data (such as music lyrics, artists, albums, album names, biographical information of artists, and the like). The third database 164 (FIG. 1B) may be designated to store speech and associated data (such as the name of the speaker, the source of the speech, and the like).

Figure 3B:
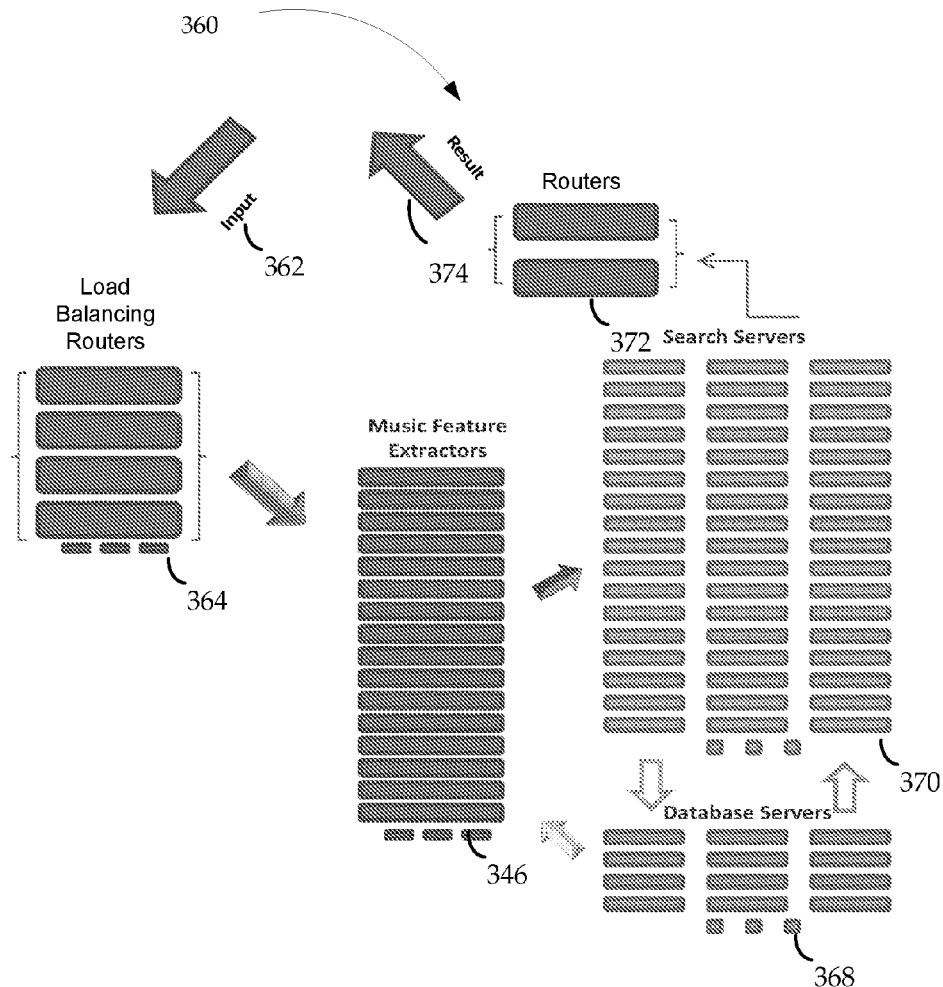
FIG. 3B is a block diagram of an exemplary environment for recognizing sounds in accordance with various embodiments of the present invention.

FIG. 3B is a block diagram of an exemplary environment 360 for recognizing sounds in accordance with various embodiments of the present invention. The exemplary environment of FIG. 3B may be included in the server or elsewhere in any of the exemplary systems of FIG. 1A, 1B, or 3A. Input 362 (such as user input and/or one or more sounds) is received by load balancing routers 364. The load balancers routers 364 distribute the workload provided by the input to one or more computing resources, such as music feature extractors 346 (which were earlier described in FIG. 3A). This distribution of the workload allows for efficient processing of the sounds, input and/or signals provided to the system.

Still referring to FIG. 3B, once the load balancing routers 364 have routed the input to the music feature extractors 346, the music feature extractors 346 extract or otherwise obtain one or more music features from the one or more sounds. The music feature extractors 346 also may work in conjunction with database servers 368 and search servers 370 to determine and obtain information relating to the music features of the sounds. Such information may include a song title, a name of an artist, an artist's biographical information, identification of similar artists, a link to download a song, a link to download a video related to the song, or any combination thereof. The search servers 370 may communicate with the database servers 368 and external servers (not shown) to determine such information. The information is then provided to routers 372, which then route the information to be transmitted for display as one or more search results 374 on a display of a computing device.

Figure 4:
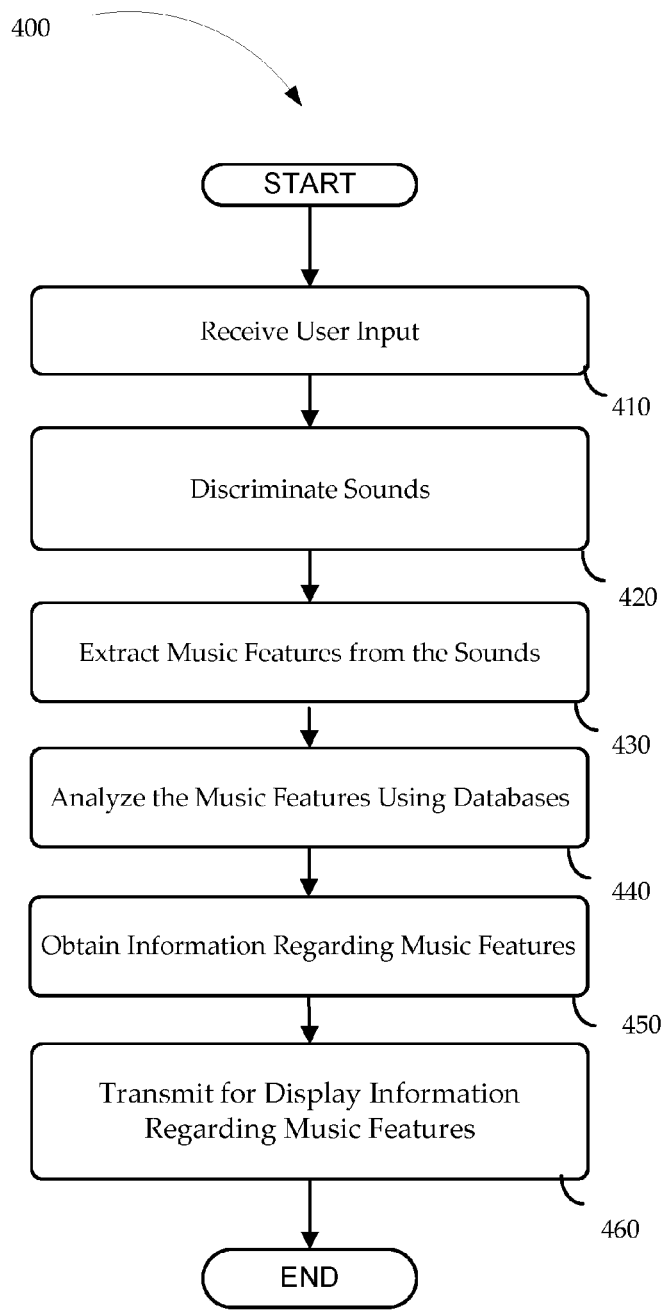
FIG. 4 is a flow diagram of an exemplary method for recognizing sounds in accordance with various embodiments of the present invention.

FIG. 4 is a flow diagram of an exemplary method 400 to recognize sounds. Although the method 400 may be utilized to recognize songs, song clips or snippets, song lyrics, partial songs, partial song lyrics, humming of songs, voicing of lyrics, and the like, it will be appreciated by one skilled in the art that this technology may be utilized for any type of sound, not just songs or lyrics.

At step 410, user input is received from a computing device. In some embodiments, the user input is provided through a microphone of a computing device (such as the microphone 312 of the computing device 310 of FIG. 3A). The user input may comprise or otherwise be associated with one or more sounds. In some embodiments, the user input may be a search query that comprises one or more sounds. The user input may include but is not limited to any number of sounds, such as humming of a portion or all of a song, a partial song clip or snippet played, and the like. User input may include any number of manual user inputs, such as keystrokes, user selection, commands, mouse clicks, presses on a touch screen, swipes of a touch screen, or button presses via the one or more computing devices. For instance, user input may include pressing a button (such as the button 311 of the computing device 310 of FIG. 3A) or user input via a unified search interface 520 of FIG. 5 which is described later herein) while recording, humming or playing a song or a portion of a song.

At step 420, discrimination of one or more sounds takes place. According to various embodiments, an audio discriminator (such as the audio discriminator 340 of FIG. 3A) may undertake the task of discriminating one or more sounds. As mentioned earlier, an audio discriminator may discriminate, distinguish, or classify sounds. The audio discriminator may discriminate monophonic sounds from polyphonic sounds with a high accuracy. The audio discriminator may analyze or look at the length of a user's query, any pitch variations in the sounds, and any discrimination between voice and music. By doing this, the technology may quickly classify sound. Furthermore, the audio discriminator may classify or discriminate voice and music, and route these sounds towards processing paths and/or algorithmic analysis.

At step 430, music features may be extracted from the one or more sounds. This step may be accomplished using music feature extractors. Exemplary music feature extractors are shown and described as music feature extractors 340 in FIGS. 3A and 3B. Music feature extractors may be coupled to both database servers and search servers. Exemplary database servers and search servers are shown and described as database servers 368 and search servers 370 in FIG. 3B.

At step 440, music features may be analyzed using one or more databases and at step 450, information regarding the music features based on the analysis may be obtained. According to various embodiments, database servers and search servers (such as exemplary database servers 368 and search servers 370 in FIG. 3B) may quickly identify and provide information related to music features of the one or more sounds. For instance, if a given sound is a song clip, the music features extracted may be enhanced or filtered music snippets which are quickly identified, recognized, classified or otherwise determined by one or more database servers and search servers.

According to various embodiments, the audio discriminator may classify the user's query. In some embodiments, the audio discriminator may classify the one or more sounds of the user's query as being (1) humming or singing sound, (2) recorded music or (3) speech. As shown in FIG. 1B, in some embodiments, the audio discriminator may route humming and singing sounds to a first sound recognition application (such as the first sound recognition application 140 of FIG. 1B). Likewise, in some embodiments, the audio discriminator may route recorded music to a second sound recognition application (such as the second sound recognition application 142 of FIG. 1B), and also route speech to a third sound recognition application (such as the third sound recognition application 144 of FIG. 1B).

According to various embodiments of the present technology, a separate database may be assigned to each of the sound recognition applications. Thus, as shown in exemplary FIG. 1B, the first sound recognition application for singing or humming sounds may search the first database (such as the first database 160 of FIG. 1B) which stores singing or humming sounds. Likewise, the second sound recognition application for recorded music may search the second database (such as the second database 162 of FIG. 1B) which stores recorded music. The third sound recognition application for speech may search the third database (such as the first database 164 of FIG. 1B) which stores speech.

It will be appreciated by one skilled in the art that any number of sound recognition applications and databases may be used with this technology to implement one or more methods described herein.

The database servers (such as database servers 368 in FIG. 3B) may store information related to music features and/or sounds. The search servers (such as search servers 370 in FIG. 3B) may aggressively search through database servers, database resources, or even the Internet to obtain in real-time information related to music features and/or sounds that may or may not be present in the database servers. It will be understood that an audio discriminator (such as the audio discriminator 340 of FIG. 3A) may comprise music feature extractors. Also, it may be appreciated that the audio discriminator may be coupled to database servers, search servers, or to any combination thereof.

Finally, at step 460, in response to the user input of a search query, the information regarding the music features of the one or more sounds is transmitted to display on the computing device (such as to the display 322 of the computing device 310 of FIG. 3A). The information may then be viewed by the user of the computing device. In a non-exhaustive list, the information regarding the music features of the one or more sounds comprises a song title, a name of an artist, an artist's biographical information, identification of similar artists, a link to download a song, a link to download a video related to the song, or any combination thereof.

An optional step for the method 400 includes utilizing load balancing routers (such as load balancing routers 364 in FIG. 3B) to distribute workload to one or more computing resources. The workload may comprise user input and the sounds at issues. By utilizing load balancing routers, an optimal and efficient delivery of various user inputs and sounds may be provided to the music feature extractors. Thus, the technology may be able to quickly identify sounds or music features of sounds within 4 seconds, in part due to the use of load balancing routers.

Further optional steps for the method 400 include providing optional premium rows dynamically to the user. The premium rows may appear on any portion of the graphical user interface shown to the user through a display of the user's computing device. For instance, on a song page, premiums rows may be added or subtracted to push relevant content relating to the song. If the song is sung by a certain artist, t-shirts, concert tickets, posters, goods, services and any other type of merchandise may be presented to the user in one or more premium rows. According to some embodiments, the relevant content relating to the song may be obtained from a server, from the network, or from any other networked resource. Another example of content for the premium rows may include links to targeted commercials. Exemplary premium rows will be described later herein in reference to FIG. 19.

Yet another optional step for the method 400 is providing a flag discriminator that is related to the song. If a user grabs a song, the technology may identify the song and then the user is presented with a graphical user interface that displays a flag on the album or song at issue. If the user already has the song in their music libraries (such as a local music database 326 in the computing device 310 of FIG. 3A or the second database 162 of FIG. 1B), then the flag will visually indicate that to the user and by pressing or clicking on the flag, the song will be played on the computing device directly. If, on the other hand, the user does not have the song stored in their music libraries already, then the flag will visually indicate to the user. The user may also be given an opportunity to purchase the song. According to some embodiments, the act to purchase the song may be simply to press the flag which will redirect the user to a third party service or content provider (such as a music online store, see 330 in FIG. 3A). The flag may visually indicate whether or not the user already has a copy of a particular song by any means, including but not limited to color of the flag, whether the flag is raised or down, the position of the flag on the graphical user interface, and the like. An exemplary flag will be described later herein in reference to FIG. 8.

A further optional step for the method 400 is to obtain and display to the user a listing of artists or songs that are underplayed. In other words, the technology may identify songs that are grabbed by users or searched by users, but these songs are not played on the radio as often as they should be. This listing of artists or songs that are underplayed may allow for users to discover music that they otherwise may not be exposed if they normally listen to the radio only. Exemplary listings of artists or songs will be described later herein in reference to FIGS. 8, 14, 15, and 16.

A further optional step for the method 400 is to provide and display a pop-open mini-player to the display of a computing device (such as the display 322 of the computing device 310 of FIG. 3A). The mini-player allows for a user to pause, play, and otherwise manipulate a song. It may also allow the user to quickly access a song page, which may be a webpage setting forth details about the song (such as the song's lyrics, the song's title, the artist of the song, the album where the song may be found, and a link to the song for playing, downloading and/or purchasing). An exemplary mini-player will be described later herein in reference to FIG. 20.

The technology may further allow for a direct call from a computing device (such as the computing device 310 of FIG. 3A) to a third party service or content provider (such as a music store, see 330 of FIG. 3A). In other words, the third party service or content may be provided to the computing device directly. The technology includes API to allow for a title of a song and/or artist to be transmitted to the third party service or content provider via a sound recognition application (such as the sound recognition application 140 of FIG. 3A or one or more of the first, second and third sound recognition applications (140, 142, and 144, respectively) as depicted in FIG. 1B)).

One skilled in the art will recognize that the scope of the present technology allows for any order or sequence of the steps of the method 400 mentioned herein to be performed. Also, it will be appreciated by one skilled in the art that the steps in the method 400 may be removed altogether or replaced with other steps (such as the optional steps described herein) and still be within the scope of the invention.

Figure 5:
FIGS. 5-20 are exemplary screenshots of a display of a computing device in accordance with various embodiments of the present invention.

FIG. 5 is an exemplary screenshot 500 of a display of a computing device in accordance with various embodiments of the present technology. FIG. 5 depicts what is initially shown to a user prior to a search being initiated. The user may be presented this screenshot 500 when the user wishes to search using a unified search interface button 520. The screenshot 500 also shows that the graphical user interface is for a search 502. The screenshot 500 further shows a help button 510 depicting a question mark, which if pressed by the user will display help menus and options that will provide information about the application.

The user may tap, actuate, press or otherwise activate the unified search interface button 520 and then provide one or more sounds as user input through a microphone of the computing device. The user is also provided with further buttons for pressing or actuation, including a "Title or Artist" button 530. When actuated or pressed, the "Title or Artist" button 530 will allow for the user to search the server and database(s) for a song by title or artist, via search box 540.

Figure 14:
Figure 15:
Figure 16:
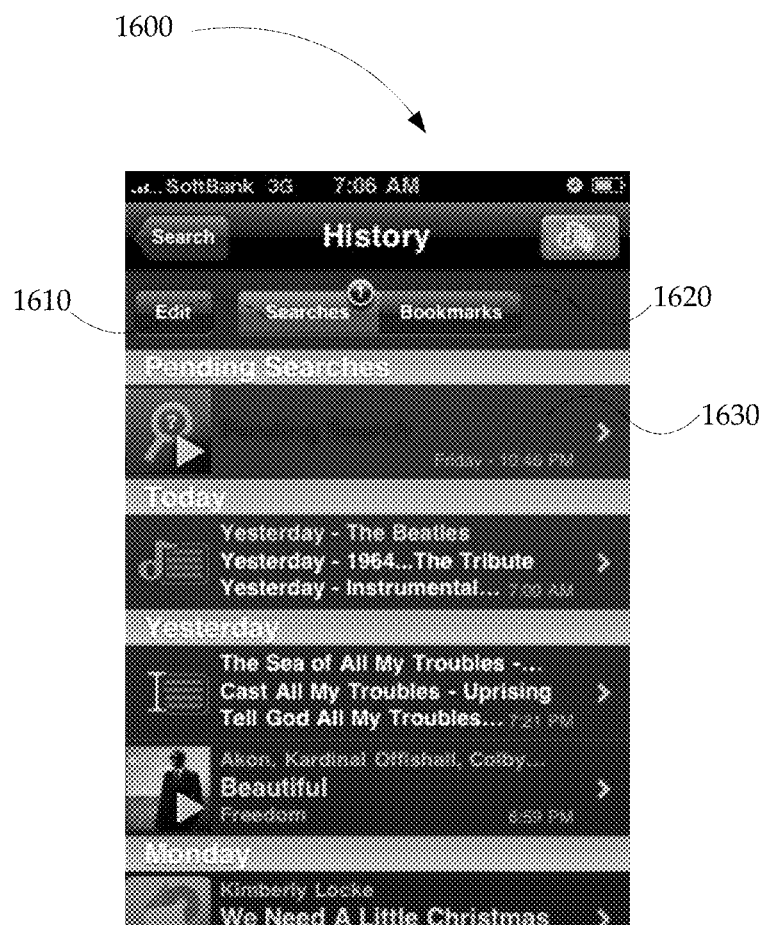

The screenshot 500 also depicts a history button 550 to allow a user to see the history of searches and songs that the user has previously requested, a "What's Hot" button 560 to provide a listing of "hot" or popular songs to the user (which will provide song listings such as those shown in exemplary FIGS. 14-16), and a "Now Playing" button 570 to provide a Now Playing page comprising a song being played and information regarding the song that is currently playing.

Figure 6:

FIG. 6 is an exemplary screenshot 600 that is displayed once the user has tapped, actuated, press or otherwise activated the unified search interface button 520. The unified search interface button 520 displays that the application is "listening" for user input and the user is invited to tap the unified search interface button 520 a second time to indicate to the application when the user input is complete and that the application may stop "listening."

If the computing device is a mobile phone, the user may search for recorded music by holding their phone towards music that is playing or by singing or humming through the same unified search interface using a single button. The user may hit a cancel button 605 to cancel a search at any time before the search is complete and search results are provided to the user. The exemplary screenshot 600 also shows an indicator 655 on the history button 550. In this case, the indicator 655 of FIG. 6 shows the number "1" to indicate that the application has a historical record of one previous search or search result.

Figure 7:
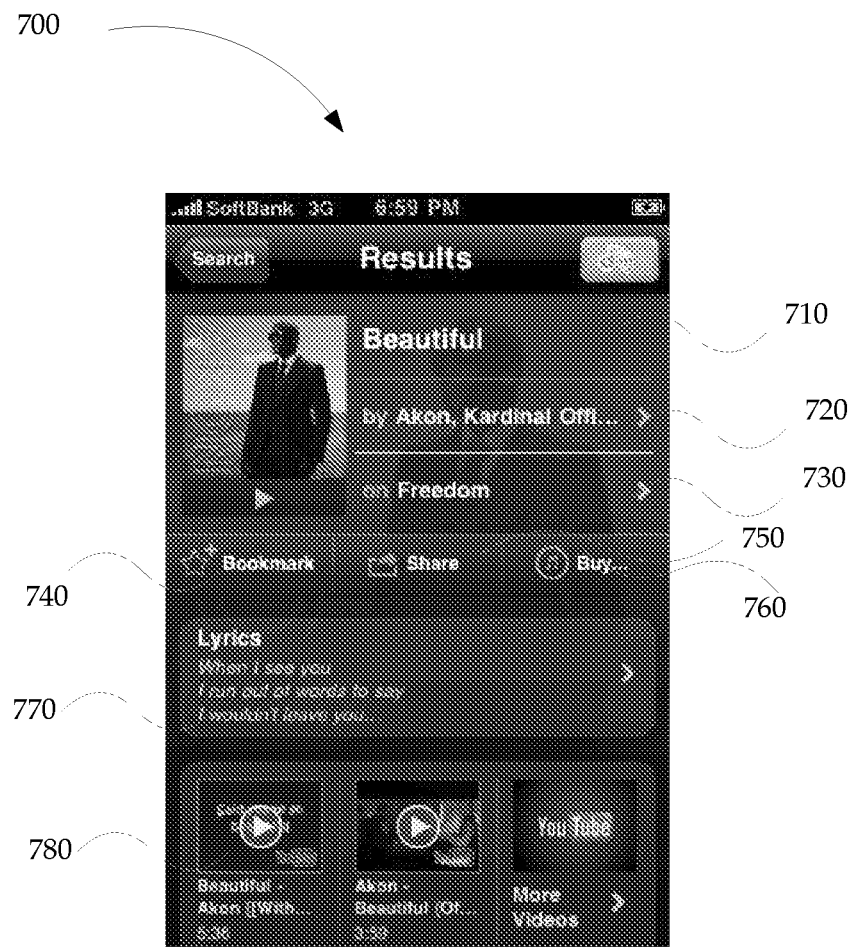

FIG. 7 is an exemplary screenshot 700 of results that are displayed when the search is complete. The screenshot 700 provides information related to the song, such as the name of a song 710, the name(s) of the artist(s) who sang the song 720, and the name of the album 730 where the song can be found. The user is given buttons to bookmark the song on their computing device 740, share the song to another user 750 or buy the song 760. Lyrics 770 of the song may also be shown. Also, related music clips or video clips 780 of the song or related to the song or artist may be provided to the user for playing if the user wishes to click, press, or otherwise activate the clips.

Figure 8:
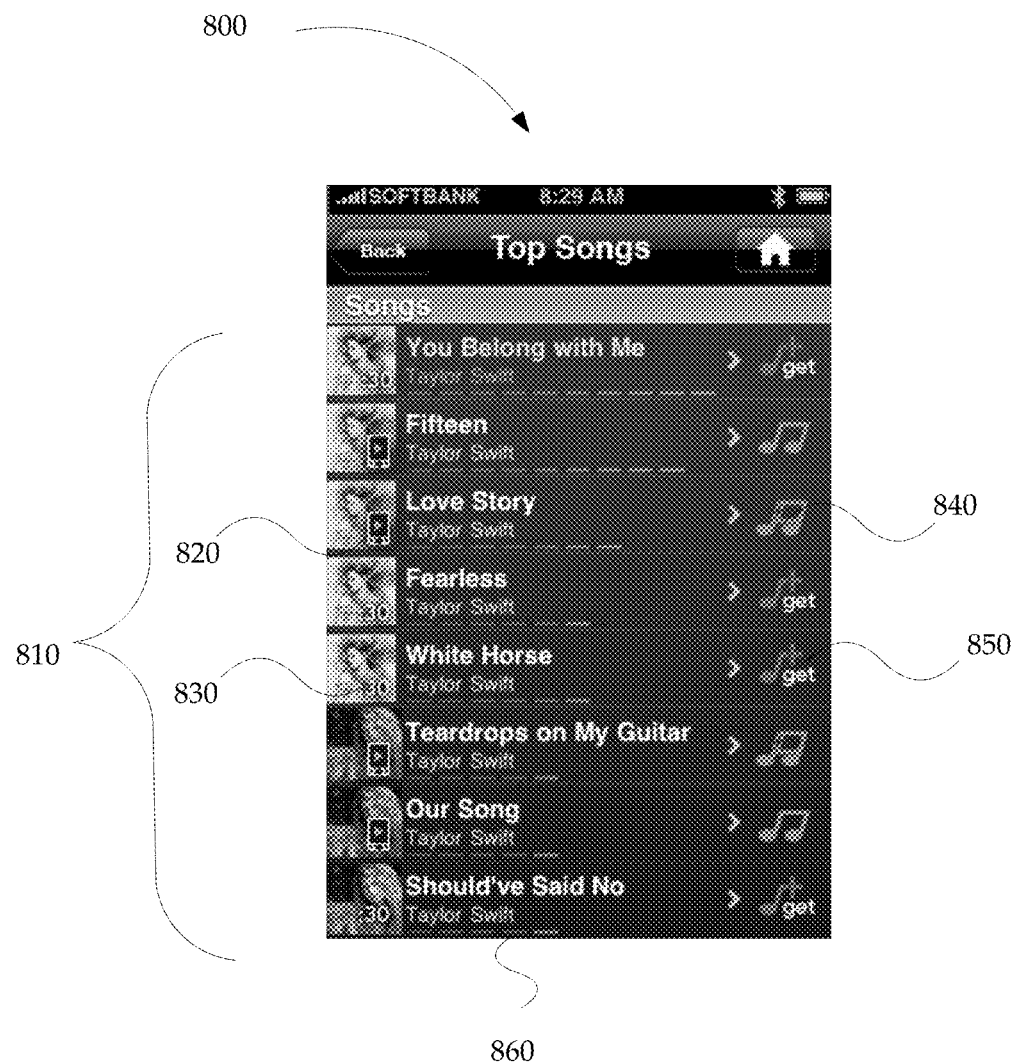

FIG. 8 is an exemplary screenshot 800 of a listing 810 of songs in a list view. Through list views, songs may be played and/or purchased. Songs listed may be from the same artist or by different artists. A user may also see whether they already own or keep the song at issue on a local music database. If the user already owns or has the song stored on a local music database (such as the local music database 326 of FIG. 3), then a play song interface button 820 appears next to the song which when actuated by a user will play the song. If, on the other hand, the user does not own or have a copy of the song, then the user will be given a preview song interface button 830 which when actuated by the user will provide a short preview of the song. In the example shown in FIG. 8, the user owns or has a copy of the song "Love Story" sung by Taylor Swift because the play song interface button 820 appears adjacent to the song. However, in FIG. 8, the user does not own the song "White Horse" sung by Taylor Swift because a preview song interface button 830 indicates that it will preview 30 seconds of the song upon actuation of the preview song interface button 830.

Furthermore, FIG. 8 provides a flag that whether a song is owned or not owned already by the user. "Owned" songs are displayed with a "My music" icon 840 for the flag. In the example shown in FIG. 8, the user can see they own the song "Love Story" sung by Taylor Swift because the "My music" icon 840 appears adjacent to the song. "Non-owned" songs or songs that the user does not already have in their possession (such as in a local music database) are given a different flag. The flag may provide an instant option for a user to purchase or "get" a song that the user does not already have in the form of "get" icon 850. In FIG. 8, the user does not own the song "White Horse" sung by Taylor Swift because the "get" icon 850 indicates that the user may "get" or purchase a copy of the song if they press or actuate the button with the "get" icon 850. Songs may be linked and shown with popularity bars 860 that show how popular a given song is.

Figure 9:

FIG. 9 is an exemplary screenshot 900 of a text search. Users may search for titles, artists and albums using an intuitive text search interface. The user may type in a text box 910, using a keyboard 920 that includes a search key 930. The text search interface may include prefix suggestions (auto complete), as well as spelling connection.

Figure 10:
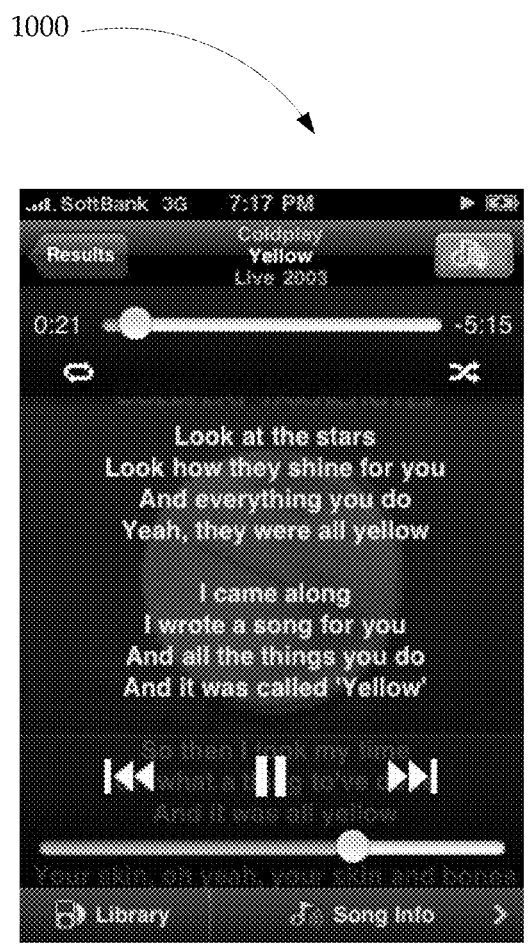
Figure 11:
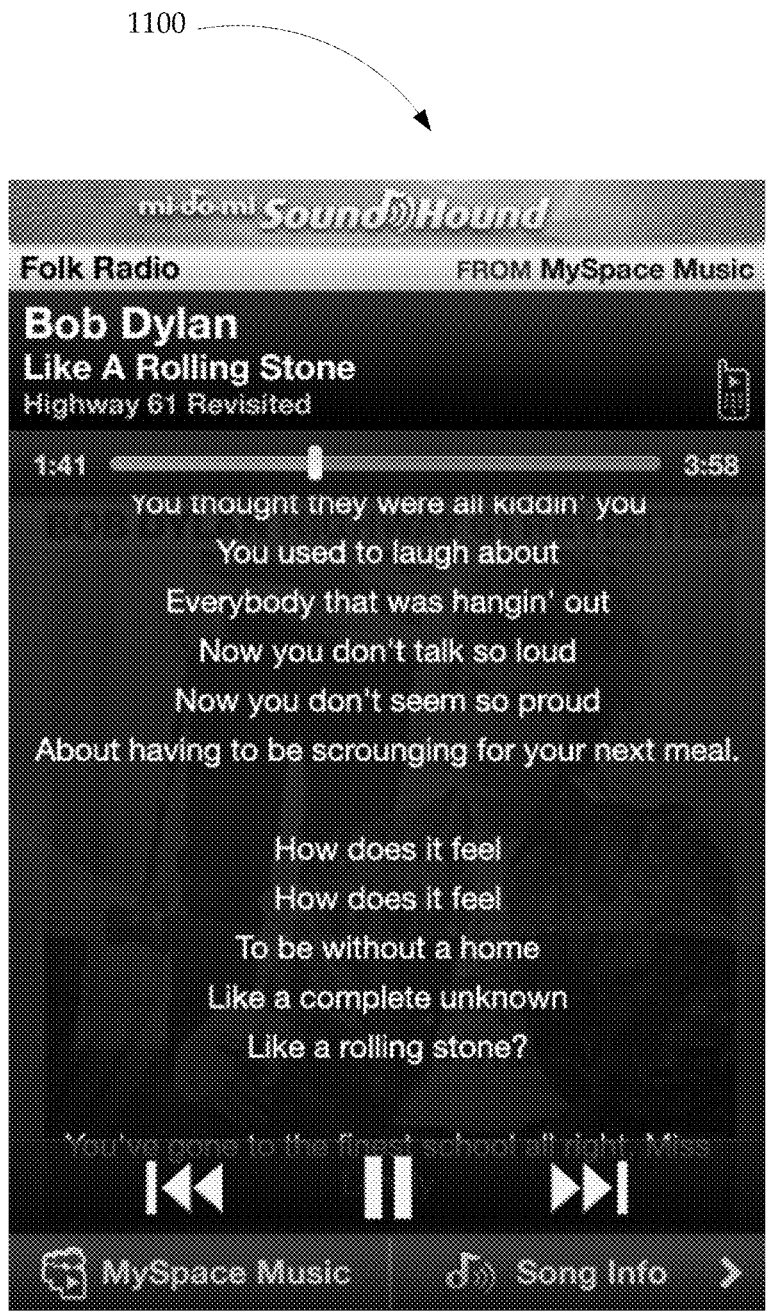

FIG. 10 is an exemplary screenshot 1000 of a lyrics display resulting from a song having being identified by singing or humming sounds as the user input. FIG. 11 is an exemplary screenshot 1100 of a lyrics display of a song resulting from a song being identified from it being played on a radio. Song lyrics may be shown as the song is being played.

Figure 12:
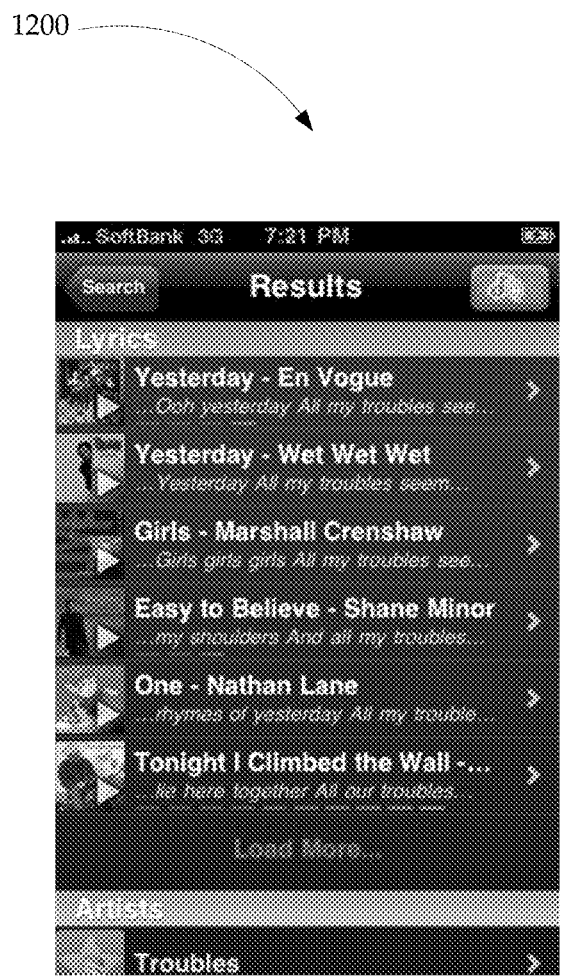

FIG. 12 is an exemplary screenshot 1200 of a lyrics search result. In the example shown in FIG. 12, after a user has typed part of a lyrics (namely, the words "All my troubles seem"), the user is provided with the screenshot 1200 showing one or more songs that result from the search for those partial lyrics.

Figure 13:

FIGS. 13-15 are exemplary screenshots of song charts which employ popularity algorithms of the technology. Such popularity algorithms take into account information from a combination of multiple sources, including billboards, radio plays and song identification by users. FIG. 13 shows an exemplary screenshot 1300 having a song charts overview listing 1310 which includes "hottest" and "underplayed" song listings. FIG. 14 shows an exemplary screenshot 1400 having the "hottest" song listing 1410 which may include a breakdown of popularity view by genre. FIG. 15 shows an exemplary screenshot 1500 having an "underplayed" song listing 1510 and a "just grabbed" song listing 1520. The "underplayed" song listing 1510 shows a listing of songs or tracks which are being identified by users but are not played as often on the radio. The "just grabbed" song listing 1520 shows the song(s) or tracks that were recently identified by other users on their computing devices using this technology.

Figure 17:
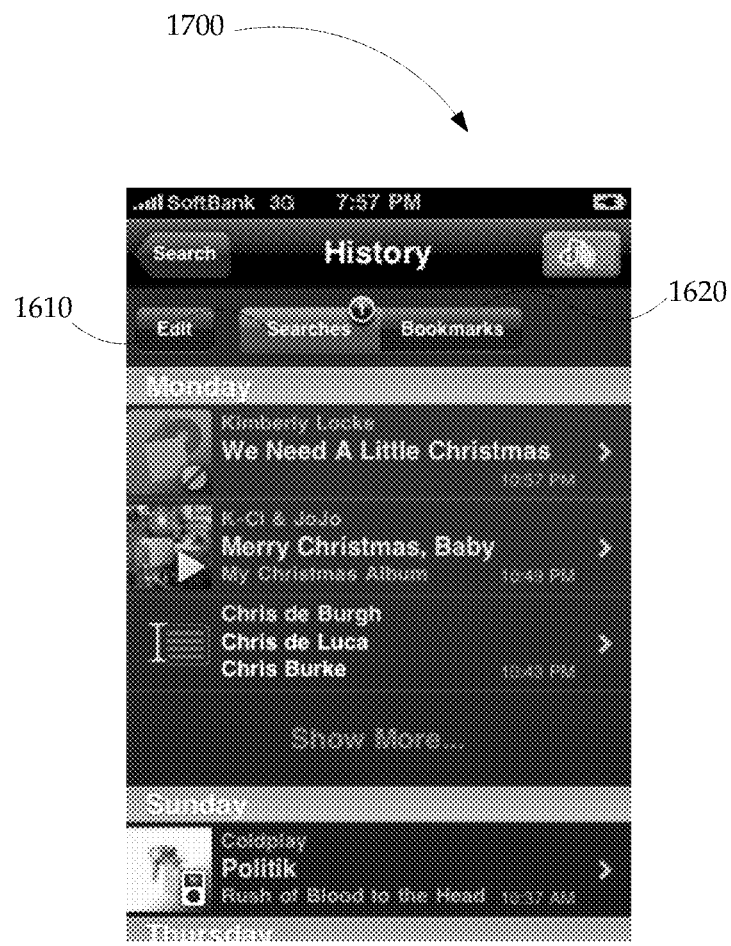

FIGS. 16 and 17 show exemplary screenshots 1600 and 1700, respectively, of history and bookmarks. Such exemplary screenshots may be displayed after a user clicks on the history button 550 as shown in FIGS. 5 and 6. As shown in both FIGS. 16 and 17, users may view the history of songs listened to or identified by clicking on or actuating a searches button 1610. Users may bookmark their favorite songs for future reference by clicking on or actuating a bookmarks button 1620. The screenshot 1600 of FIG. 16 also shows a pending search 1630 is being conducted. If there is no wireless or network connection while searching, the application may save the pending search so that users may obtain results when they have connectivity. FIG. 17 shows a screenshot 1700 similar to that of FIG. 16, except that no pending search is shown as no search is being conducted in the screenshot 1700.

Figure 18:
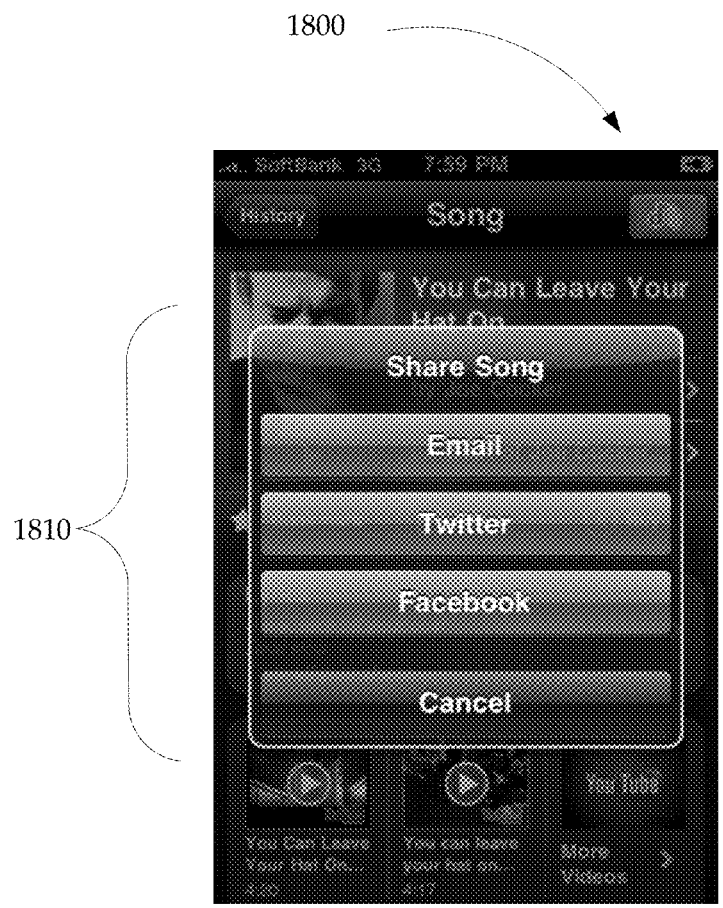

FIG. 18 is an exemplary screenshot 1800 that is displayed when a user wishes to share music content. The screenshot 1800 shows a share song menu 1810, which includes a plurality of buttons that allow for a user to press or actuate to share a song by email, Twitter®, Facebook® or to cancel sharing the song altogether.

Figure 19:
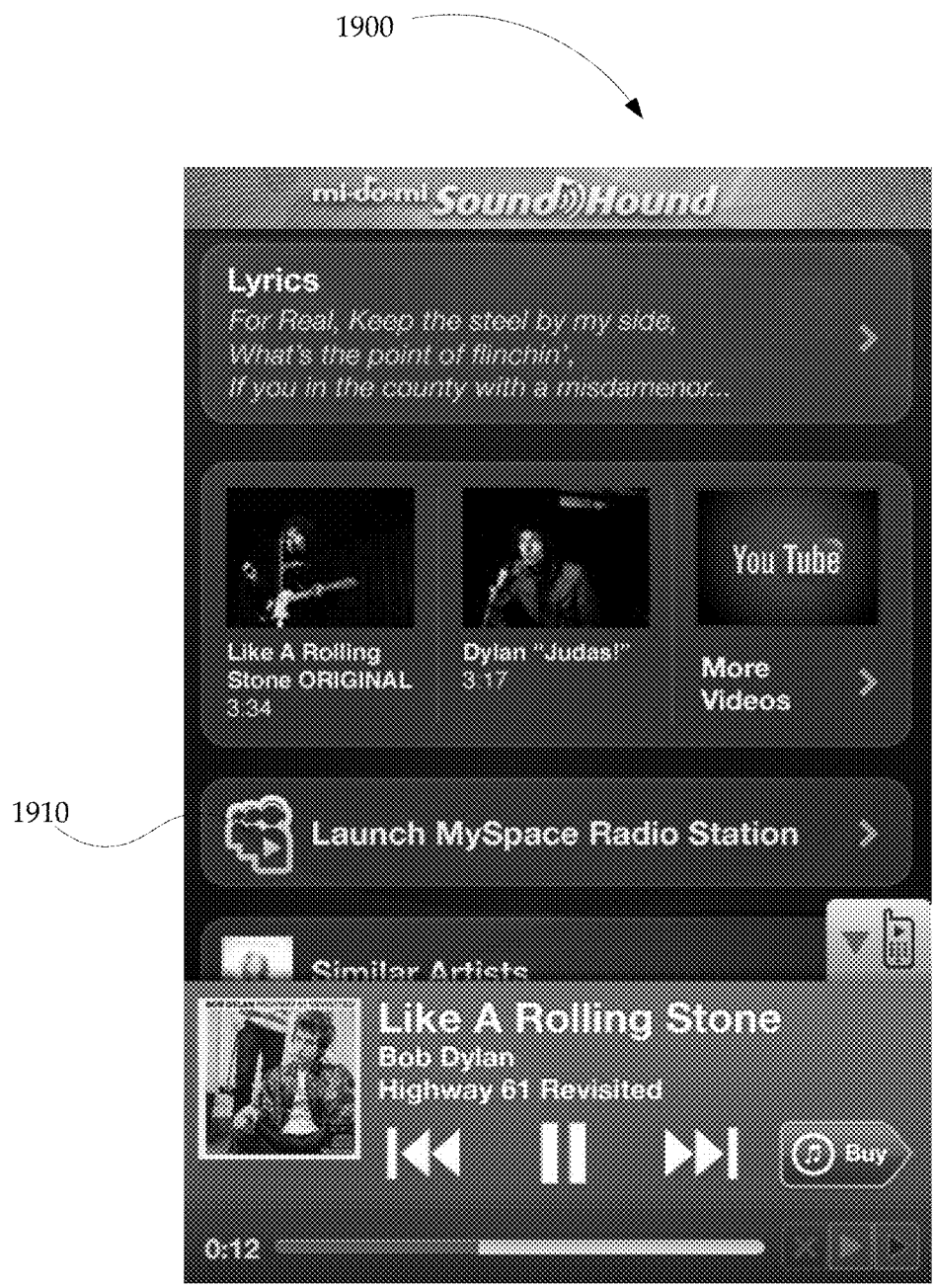

FIG. 19 is an exemplary screenshot 1900 that shows a premium row 1910. As described herein previously, one or more premium rows may comprise a button that is controlled from a server for pushing relevant commercial content. In some embodiments, the relevant commercial content may be related to the song or to the artist that is identified or being played. A non-exhaustive list of commercial content for premium rows includes, but is not limited to, ringtones, full track downloads, t-shirts, concert tickets, sheet music, posters, avatars, skins, animations, and links to third party services. In the example provided in FIG. 19, the premium row 1910 is a button that, if actuated or pressed by the user, will launch a MySpace® radio station as a link to this third party service.

Figure 20:
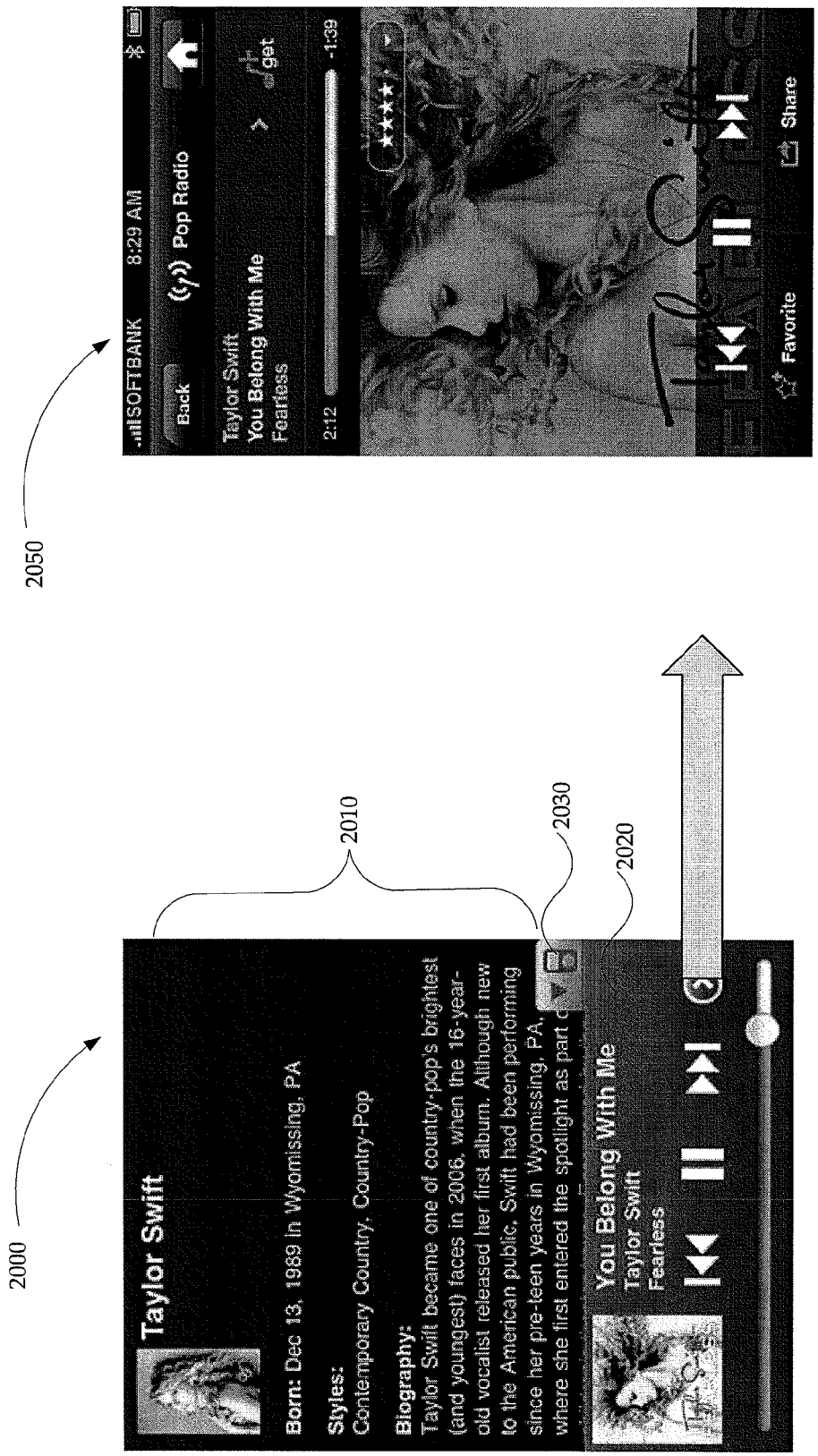

FIG. 20 shows two exemplary screenshots 2000 and 2050. In the exemplary screenshot 2000, an artist's biography 2010 is presented along with a mini-player 2020 below the artist's biography 2010. The mini-player 2020 may play a song of the artist. The mini-player 2020 may include rewind, pause, fast-forward and play buttons for a user to utilize in order to manipulate the song. If a user presses a "more" button 2030, then the exemplary screenshot 2050 is presented to the user on the display of the computing device. In other words, the "more" button 2030 takes a user back to a current Now Playing page which shows information about a song being currently played on the computing device. An exemplary Now Playing page is provided in the exemplary screenshot 2050.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for recognizing one or more sounds on a server computer, the method comprising:
   receiving on the server computer a user input from a computing device, the user input providing a search query comprising the one or more sounds, the one or more sounds having been recorded on the computing device using at least one microphone;
   executing instructions stored in memory on the server computer, wherein execution of the instructions by a processor on the server computer:
      provides an available set of databases, each database comprising a sound type and associated data, the available set of databases comprising a first database for recorded audio and second database for speech,
      discriminates the one or more sounds by classifying the one or more sounds according to a sound type and routing the one or more sounds to a corresponding sound recognition application for processing based on the sound type, the corresponding sound recognition application being selected from a first sound recognition application for recorded audio and second sound recognition application for speech,
      extracts features from the one or more sounds,
      analyzes the extracted features using a database selected from the available set of databases based on the sound type, and
      obtains information regarding the extracted features based on the analysis; and
   in response to the search query, transmitting for display the information regarding the extracted features of the one or more sounds to the computing device.

2. The method of claim 1, wherein the method discriminates the one or more sounds by classifying the one or more sounds of the search query as at least one of a singing or humming sound, a recorded music sound, and a speech sound.

3. The method of claim 1, wherein the one or more sounds includes any of a song, a song clip, a song snippet, a singing or humming sound, voice, spoken words or any combination thereof.

4. The method of claim 1, wherein information regarding the extracted features of the one or more sounds comprises a song title, a name of an artist, an artist's biographical information, identification of similar artists, a link to download a song, a link to download a video related to the song, or any combination thereof.

5. The method of claim 1, further comprising executing instructions stored in memory, wherein execution of the instructions by a processor separates sound artifacts from the sound by noise cancellation.

6. The method of claim 1, further comprising:
   executing instructions stored in memory, wherein execution of the instructions by a processor determines whether the extracted features of the one or more sounds are already included in a local music database of the computing device; and
   transmitting to display a flag on the display of the computing device, the flag depicting the determination of whether the extracted features of the one or more sounds are already included in a local music database of the computing device.

7. The method of claim 1, further comprising:
   executing instructions stored in memory, wherein execution of the instructions by a processor provides relevant content relating to the extracted features; and
   transmitting to display a premium row on the display of the computing device, the premium row depicting the relevant content relating to the extracted features.

8. A method for recognizing one or more sounds on a server computer, the method comprising:
   receiving on the server computer a user input from a computing device, the user input providing a search query comprising the one or more sounds, the one or more sounds having been recorded on the computing device using at least one microphone;
   executing instructions stored in memory on the server computer, wherein execution of the instructions by a processor on the server computer:
      provides an available set of sound recognition applications, the available set of sound recognition applications comprising a first sound recognition application for recorded audio and second sound recognition application for speech;
      provides an available set of databases, each database comprising a sound type and associated data, the available set of databases comprising a first database for recorded audio and second database for speech;
      discriminates the one or more sounds by classifying the one or more sounds according to a sound type and routing the one or more sounds to a corresponding sound recognition application for processing based on the sound type, the corresponding sound recognition application being selected from the available set of sound recognition applications,
      analyzes a databases for searching based on the sound type using data included in the discriminated one or more sounds, the database being selected from the available set of databases, and
      obtains information regarding the discriminated one or more sounds based on the analysis; and in response to the search query, transmitting for display the information regarding the discriminated one or more sounds to the display of the computing device.

9. A non-transitory computer readable storage medium having embodied thereon a program, the program being executable by a processor to perform a method for recognizing one or more sounds, the method comprising:

receiving on a server computer a user input from a computing device, the user input providing a search query comprising the one or more sounds, the one or more sounds having been recorded on the computing device using at least one microphone;

providing an available set of sound recognition applications on the server computer, the available set of sound recognition applications comprising a first sound recognition application for recorded audio and second sound recognition application for speech;

providing an available set of databases on the server computer, each database comprising a sound type and associated data, the available set of databases comprising a first database for recorded audio and second database for speech;

discriminating the one or more sounds on the server computer by classifying the sound according to a sound type and routing the sound to a corresponding sound recognition application for processing based on the sound type, the corresponding sound recognition application being selected from of the available set of sound recognition applications;

analyzing a database on the server computer based on the sound type using data included in the discriminated sound, the database being selected from the available set of databases;

obtaining information regarding the discriminated one or more sounds, from the database, based on the analysis; and in response to the search query, transmitting for display the information regarding the discriminated one or more sounds to the computing device.

10. The non-transitory computer readable storage medium of claim 9, wherein discriminating the one or more sounds further comprises classifying the one or more sounds of the search query as at least one of a singing or humming sound, a recorded music sound, and a speech sound.

11. The non-transitory computer readable storage medium of claim 9, wherein the one or more sounds includes any of a song, a song clip, a song snippet, a humming sound, voice, or any combination thereof.

12. The non-transitory computer readable storage medium of claim 9, wherein information regarding the discriminated one or more sounds comprises a song title, a name of an artist, an artist's biographical information, identification of similar artists, a link to download a song, a link to download a video related to the song, or any combination thereof.

13. The non-transitory computer readable storage medium of claim 9, wherein the method further comprises executing instructions stored in memory, wherein execution of the instructions by a processor separates sound artifacts from the one or more sounds by noise cancellation.

14. The non-transitory computer readable storage medium of claim 9, wherein the method further comprises:

executing instructions stored in memory, wherein execution of the instructions by a processor determines whether the information regarding the discriminated one or more sounds is already included in a local music database of the computing device; and transmitting to display a flag on the display of the computing device, the flag depicting the determination of whether the information regarding the discriminated one or more sounds is already included in a local music database of the computing device.

15. The non-transitory computer readable storage medium of claim 9, wherein the method further comprises:

executing instructions stored in memory, wherein execution of the instructions by a processor provides relevant content relating to the discriminated one or more sounds; and transmitting to display a premium row on the display of the computing device, the premium row depicting the relevant content relating to the discriminated one or more sounds.

16. A system for recognizing one or more sounds, comprising:

a computing device having a display;

one or more databases coupled to the computing device;

a server having a music processor, the server being coupled to the computing device and the one or more databases, the music processor configured to execute instructions stored in memory to:

receive a user input from the computing device, the user input providing a search query comprising the one or more sounds, the one or more sounds having been recorded on the computing device using at least one microphone, provide an available set of sound recognition applications, the available set of sound recognition applications comprising a first sound recognition application for recorded audio and second sound recognition application for speech;

provide an available set of databases, each database comprising a sound type and associated data, the available set of databases comprising a first database for recorded audio and second database for speech;

discriminate the one or more sounds by classifying the one or more sounds according to a sound type and routing the one or more sounds to a corresponding sound recognition application for processing based on the sound type, the corresponding sound recognition application being selected from the available set of sound recognition applications, analyze a database based on the sound type using data included in the discriminated one or more sounds, the database being selected from the available set of databases, and obtain information regarding the discriminated one or more sounds, from the database, based on the analysis; and in response to the search query, transmit for display the information regarding the discriminated one or more sounds to the computing device.

17. The system of claim 16, wherein the processor is further configured to classify the one or more sounds of the search query as at least one of a singing or humming sound, a recorded music sound, and a speech sound.

18. The system of claim 16, wherein the one or more sounds includes a song, a song clip, a song snippet, a humming sound, voice, or any combination thereof.

19. The system of claim 16, wherein information regarding the discriminated one or more sounds comprises a song title, a name of an artist, an artist's biographical information, identification of similar artists, a link to download or purchase a song, a link to download or purchase a video related to the song, or any combination thereof.

20. The system of claim 16, wherein the processor is further configured to execute instructions stored in memory to separate sound artifacts from the one or more sounds by noise cancellation.

21. The system of claim 16, wherein the processor is further configured to execute instructions stored in memory to determine whether the information regarding the discriminated one or more sounds is already included in a local music database of the computing device, and the method further comprises transmitting to display a flag on the display of the computing device, the flag depicting the determination of whether the information regarding the discriminated one or more sounds is already included in a local music database of the computing device.

22. The system of claim 16, wherein the processor is further configured to execute instructions stored in memory to provide relevant content relating the discriminated one or more sounds; and the method further comprises transmitting to display a premium row on the display of the computing device, the premium row depicting the relevant content relating to the discriminated one or more sounds.

23. A system for recognizing one or more sounds, comprising:
a computing device having a display;
three databases coupled to a server computer,
the server computer having a music processor, the music processor having three sound recognition applications coupled to the three databases, the server computer being coupled to the computing device and the three databases, the music processor configured to execute instructions stored in memory to:
  receive a user input from the computing device, the user input providing a search query comprising the one or more sounds, the one or more sounds having been recorded on the computing device using at least one microphone,
  discriminates the one or more sounds by classifying the one or more sounds according to a sound type and routing the one or more sounds to a corresponding sound recognition application for processing based on the sound type, corresponding sound recognition application being selected from a group of sound recognition applications comprising at least two of a first sound recognition application for singing or humming sounds, a second sound recognition application for recorded music, and a third sound recognition application for speech,
  extract music features from the one or more sounds,
  analyzes and searches the music features using a database for searching based on the sound type using data included in the discriminated one or more sounds, the database being selected from a group of databases comprising at least two of a first database for singing or humming sounds, a second database for recorded music, and a third database for speech, and
  obtains information regarding the music features, from the one or more databases, based on the analysis, searching and extraction; and
  in response to the search query transmitting for display the information regarding the music features of the one or more sounds to the display of the computing device.

24. A computing device comprising:
a display displaying a flag and a local music database for storing one or more music features, the flag generated by a server coupled to the computing device, the flag visually depicting a determination of whether music features of one or more sounds are already stored in the local music database of the computing device, the flag being transmitted by the server to display on the display of the computing device, the one or more sounds having been:
recorded on the computing device using at least one microphone;
classified according to a sound type, the sound types comprising both a recorded audio sound type and a speech sound type; and
routed to a corresponding sound recognition application for processing based on the sound type, the recorded audio sound type being routed to a first sound recognition application for recorded audio and the speech sound type being routed to a second sound recognition application for speech.

25. A computing device comprising:
a display displaying a premium row, the premium row generated by a server coupled to the computing device, the premium row depicting relevant content relating to music features of one or more sounds, the premium row being transmitted by the server to display on the display of the computing device, the one or more sounds having been:
recorded on the computing device using at least one microphone;
classified according to a sound type the sound types comprising both a recorded audio sound type and a speech sound type; and
routed to a corresponding sound recognition application for processing based on the sound type, the recorded audio sound type being routed to a first sound recognition application for recorded audio and the speech sound type being routed to a second sound recognition application for speech.

26. The method of claim 8, the available set of sound recognition applications further comprising a third sound recognition application for recorded television programs, the group of databases further comprising a third database for recorded television programs.

27. The method of claim 8, the available set of sound recognition applications further comprising a third sound recognition application for recorded audio, the group of databases further comprising a third database for recorded audio.

28. The system of claim 23, the group of sound recognition applications further comprising a fourth sound recognition application for recorded television programs, the group of databases further comprising a fourth database for recorded television programs.

* * * * *